United States Patent
Liu et al.

(10) Patent No.: US 11,388,748 B2
(45) Date of Patent: Jul. 12, 2022

(54) METHOD AND DEVICE IN COMMUNICATION NODE USED FOR WIRELESS COMMUNICATION

(71) Applicants: Zheng Liu, Shanghai (CN); Xiaobo Zhang, Shanghai (CN)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 220 days.

(21) Appl. No.: 16/897,244

(22) Filed: Jun. 9, 2020

(65) Prior Publication Data

US 2020/0305188 A1 Sep. 24, 2020

Related U.S. Application Data

(63) Continuation of application No. PCT/CN2017/117980, filed on Dec. 22, 2017.

(51) Int. Cl.
*H04W 74/08* (2009.01)
*H04W 56/00* (2009.01)
(Continued)

(52) U.S. Cl.
CPC ....... *H04W 74/08* (2013.01); *H04W 56/0005* (2013.01); *H04W 56/0045* (2013.01);
(Continued)

(58) Field of Classification Search
None
See application file for complete search history.

(56) References Cited

U.S. PATENT DOCUMENTS

2020/0084782 A1* 3/2020 Rune ................ H04W 72/1289
2020/0314896 A1* 10/2020 Koorapaty ........ H04W 72/0446

FOREIGN PATENT DOCUMENTS

| CN | 101426274 A | 5/2009 |
| CN | 101873713 A | 10/2010 |

(Continued)

OTHER PUBLICATIONS

ISR received in application No. PCT/CN2017/117980 dated Mar. 10, 2018.

*Primary Examiner* — Jutai Kao

(57) ABSTRACT

The present disclosure provides a method and a device in a communication node for wireless communications. The communication node first receives first information; then receives a first signaling in X time windows; and transmits a first radio signal; wherein the first information is used to determine the X time windows, time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information. The method in the present disclosure ensures uplink synchronous transmissions and improves link-level and system-level performance.

20 Claims, 12 Drawing Sheets

(51) Int. Cl.
*H04W 74/00* (2009.01)
*H04W 72/04* (2009.01)
*H04W 72/12* (2009.01)
*H04W 72/14* (2009.01)

(52) U.S. Cl.
CPC ........ *H04W 74/006* (2013.01); *H04W 72/042* (2013.01); *H04W 72/1263* (2013.01); *H04W 72/14* (2013.01)

(56) References Cited

FOREIGN PATENT DOCUMENTS

| | | |
|---|---|---|
| CN | 104581925 A | 4/2015 |
| WO | 2012177060 A | 12/2012 |

\* cited by examiner

METHOD AND DEVICE IN COMMUNICATION NODE USED FOR WIRELESS COMMUNICATION

CROSS REFERENCE TO RELATED APPLICATIONS

This application is a continuation of International Application No. PCT/CN2017/117980, filed on Dec. 22, 2017, claiming the priority benefit of International Application PCT/CN2017/117980, filed on Dec. 22, 2017, the full disclosure of which is incorporated herein by reference.

BACKGROUND

Technical Field

The present disclosure relates to transmission methods and devices in wireless communication systems and in particular to a transmission scheme and device in non-terrestrial wireless communications.

Related Art

The application scenarios of wireless communication systems will become increasingly diverse in the future, and different application scenarios pose different performance requirements on the systems. In order to meet the different performance requirements of various application scenarios, the research on New Radio (NR), or what is called Fifth Generation (5G), is decided to be conducted at 3rd Generation Partner Project (3GPP) Radio Access Network (RAN) #72 plenary, and the Work Item (WI) of NR was approved at 3GPP RAN #75 plenary to standardize NR.

In order to adapt to various application scenarios and meet different requirements, a research project on Non-Terrestrial Networks (NTN) under NR was approved at 3GPP RAN #75 plenary. The research project started in Release 15, and a WI will start in Release 16 to standardize related techniques.

SUMMARY

In NTN, a User Equipment (UE) and a satellite or an aircraft communicate via 5G networks. The coverage of the satellite or the aircraft on the ground is much larger than that of a traditional base station. And due to different angles and heights, delays of different UEs covered by a same satellite or aircraft to the serving satellite or aircraft are very different. According to the calculation in 3GPP TR38.811, delay differences can reach over ten milliseconds (for example, a maximum delay difference that can be found in a geosynchronous satellite is about 16 milliseconds). In existing NR systems, the design of synchronization broadcast channels (i.e., SS/PBCH Block) can support up to 64 analog beams. At the same time, synchronous transmissions with a delay difference less than 5 ms can be distinguished by an indication of a Physical Random Access Channel (PRACH), so as to ensure the accuracy of the Timing of an uplink transmission (generally referred to as Timing Advance, or TA). Due to the large delay difference in NTN, the network equipment cannot tell whether a Random Access Channel carrying two identical SS/PBCH Block indexes performs an uplink transmission based on the timing of the same SS/PBCH Block or based on the timing of two different SS/PBCH Blocks (but with a same index value), so a Round Trip Time (RTT) of a transmission cannot be correctly determined, which will cause erroneous timing in uplink transmissions, resulting in inter-carrier interference or performance degradation at link level or system level.

The disclosure provides a solution to the problem of timing ambiguity caused by large delay differences in NR NTN communication. It should be noted that the embodiments of a base station and the characteristics of the embodiments in the present disclosure may be applied to a UE if no conflict is incurred, and vice versa. Further, the embodiments and the characteristics of the embodiments in the present disclosure may be mutually combined if no conflict is incurred.

The present disclosure provides a method in a first-type communication node for wireless communications, comprising:
receiving first information;
receiving a first signaling in X time windows; and
transmitting a first radio signal;
wherein the first information is used to determine the X time windows, and time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information, the first signaling, the second information and the first radio signal are all transmitted through an air interface.

In one embodiment, the first-type communication node adjusts and compensates a start time for a transmission of the first radio signal according to the position of the first time-domain resources in the X time windows and avoids the mismatch of uplink timing between the network side and the user side, thus ensuring the synchronization and orthogonality of the uplink transmissions, and improving the performance of the uplink transmission.

In one embodiment, the first-type communication node determines the TA compensation according to the position of the first time-domain resources in the X time windows, which saves the overhead and improves the resource utilization rate.

According to one aspect of the present disclosure, the above method is characterized in further comprising:
receiving second information;
wherein the second information is used to determine the first transmission timing adjustment, and the first signaling is used to determine time-frequency resources occupied by a transmission of the second information, the second information being transmitted through the air interface.

According to one aspect of the present disclosure, the above method is characterized in further comprising:
transmitting a second radio signal;
wherein air-interface resources occupied by the second radio signal are used to determine a first characteristic identity, and the first signaling carries the first characteristic identity; an end time for a transmission of the second radio signal is used to determine start times of the X time windows, and the second radio signal is transmitted through the air interface.

According to one aspect of the present disclosure, the above method is characterized in that any two of the X time windows are orthogonal in time domain; the first signaling belongs to a first time window, and the first time window is one of the X time windows; the second transmission timing adjustment is one of Q candidate timing adjustments, the Q being a positive integer greater than 1; a position of the first time window among the X time windows is used to determine the second transmission timing adjustment out of the Q candidate timing adjustments.

According to one aspect of the present disclosure, the above method is characterized in further comprising:
receiving third information;
wherein the start time for the transmission of the first radio signal is a first time, and an expected start time for a reception of the first radio signal is a second time; a sum of the first transmission timing adjustment and the second transmission timing adjustment is used to determine a time length of a time interval between the first time and the second time; the third information is used to determine the second time, and the third information is transmitted through the air interface.

According to one aspect of the present disclosure, the above method is characterized in further comprising:
receiving fourth information;
wherein the fourth information is used to determine a time length of one of the X time windows.

The present disclosure provides a method in a second-type communication node for wireless communications, comprising:
transmitting first information;
transmitting a first signaling in X time windows; and
receiving a first radio signal;
wherein the first information is used to determine the X time windows, time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information, the first signaling, the second information and the first radio signal are all transmitted through an air interface.

According to one aspect of the present disclosure, the above method is characterized in further comprising:
transmitting second information;
wherein the second information is used to determine the first transmission timing adjustment, and the first signaling is used to determine time-frequency resources occupied by a transmission of the second information, the second information being transmitted through the air interface.

According to one aspect of the present disclosure, the above method is characterized in further comprising:
receiving a second radio signal;
wherein air-interface resources occupied by the second radio signal are used to determine a first characteristic identity, and the first signaling carries the first characteristic identity; an end time for a transmission of the second radio signal is used to determine start times of the X time windows, and the second radio signal is transmitted through the air interface.

According to one aspect of the present disclosure, the above method is characterized in that any two of the X time windows are orthogonal in time domain; the first signaling belongs to a first time window, and the first time window is one of the X time windows; the second transmission timing adjustment is one of Q candidate timing adjustments, the Q being a positive integer greater than 1, and a position of the first time window among the X time windows is used to determine the second transmission timing adjustment out of the Q candidate timing adjustments.

According to one aspect of the present disclosure, the above method is characterized in further comprising:
transmitting third information;
wherein the start time for the transmission of the first radio signal is a first time, and an expected start time for a reception of the first radio signal is a second time; a sum of the first transmission timing adjustment and the second transmission timing adjustment is used to determine a time length of a time interval between the first time and the second time; the third information is used to determine the second time, and the third information is transmitted through the air interface.

According to one aspect of the present disclosure, the above method is characterized in further comprising:
transmitting fourth information;
wherein the fourth information is used to determine a time length of one of the X time windows.

The present disclosure provides a first-type communication node device for wireless communications, comprising:
a first receiver, receiving first information;
a second receiver, receiving a first signaling in X time windows; and
a first transmitter, transmitting a first radio signal;
wherein the first information is used to determine the X time windows, time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information, the first signaling, the second information and the first radio signal are all transmitted through an air interface.

According to one aspect of the present disclosure, the above first-type communication node is characterized in that the second receiver also receives second information; the second information is used to determine the first transmission timing adjustment, and the first signaling is used to determine time-frequency resources occupied by a transmission of the second information, the second information being transmitted through the air interface.

According to one aspect of the present disclosure, the above first-type communication node is characterized in that the first transmitter also transmits a second radio signal; air-interface resources occupied by the second radio signal are used to determine a first characteristic identity, and the first signaling carries the first characteristic identity; an end time for a transmission of the second radio signal is used to determine start times of the X time windows, and the second radio signal is transmitted through the air interface.

According to one aspect of the present disclosure, the above first-type communication node is characterized in that any two of the X time windows are orthogonal in time domain; the first signaling belongs to a first time window, and the first time window is one of the X time windows; the second transmission timing adjustment is one of Q candidate timing adjustments, the Q being a positive integer greater than 1, and a position of the first time window among the X time windows is used to determine the second transmission timing adjustment out of the Q candidate timing adjustments.

According to one aspect of the present disclosure, the above first-type communication node is characterized in that the second receiver also receives third information; the start time for the transmission of the first radio signal is a first time, and an expected start time for a reception of the first radio signal is a second time; a sum of the first transmission timing adjustment and the second transmission timing adjustment is used to determine a time length of a time interval between the first time and the second time; the third information is used to determine the second time, and the third information is transmitted through the air interface.

According to one aspect of the present disclosure, the above first-type communication node is characterized in that the first receiver also receives fourth information; the fourth information is used to determine a time length of one of the X time windows.

The present disclosure provides a second-type communication node for wireless communications, comprising:
   a second transmitter, transmitting first information;
   a third transmitter, transmitting a first signaling in X time windows; and
   a third receiver, receiving a first radio signal;
   wherein the first information is used to determine the X time windows, time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resource in the X time windows; the first information, the first signaling, the second information and the first radio signal are all transmitted through an air interface.

According to one aspect of the present disclosure, the above second-type communication node is characterized in that the third transmitter also transmits second information; the second information is used to determine the first transmission timing adjustment, and the first signaling is used to determine time-frequency resources occupied by a transmission of the second information, the second information being transmitted through the air interface.

According to one aspect of the present disclosure, the above second-type communication node is characterized in that the third receiver also receives a second radio signal; air-interface resources occupied by the second radio signal are used to determine a first characteristic identity, and the first signaling carries the first characteristic identity; an end time for a transmission of the second radio signal is used to determine start times of the X time windows, and the second radio signal is transmitted through the air interface.

According to one aspect of the present disclosure, the above second-type communication node is characterized in that any two of the X time windows are orthogonal in time domain; the first signaling belongs to a first time window, and the first time window is one of the X time windows; the second transmission timing adjustment is one of Q candidate timing adjustments, the Q being a positive integer greater than 1, and a position of the first time window among the X time windows is used to determine the second transmission timing adjustment out of the Q candidate timing adjustments.

According to one aspect of the present disclosure, the above second-type communication node is characterized in that the third transmitter also transmits third information; the start time for the transmission of the first radio signal is a first time, and an expected start time for a reception of the first radio signal is a second time; a sum of the first transmission timing adjustment and the second transmission timing adjustment is used to determine a time length of a time interval between the first time and the second time; the third information is used to determine the second time, and the third information is transmitted through the air interface.

According to one aspect of the present disclosure, the above second-type communication node is characterized in that the second transmitter also transmits fourth information; the fourth information is used to determine a time length of one of the X time windows.

In one embodiment, the present disclosure has the following technical advantages:

the present disclosure provides a method for further TA compensation made by the user side based on TA configuration of the network side. The method does not require the network side to accurately obtain uplink timing information of UE. The UE compensates the timing of an uplink transmission based on the understanding of the network side so as to avoid the mismatch of uplink timing between the network side and the user side, thereby ensuring the synchronization and orthogonality of the uplink transmissions, and improving the performance of the uplink transmissions;

the UE's TA compensation by itself in the present disclosure judges TA compensation according to a position of a time window in which the network side transmits a RAR, which saves the overhead and improves the resource utilization rate.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is incurred.

Embodiment 1

Figure 1:
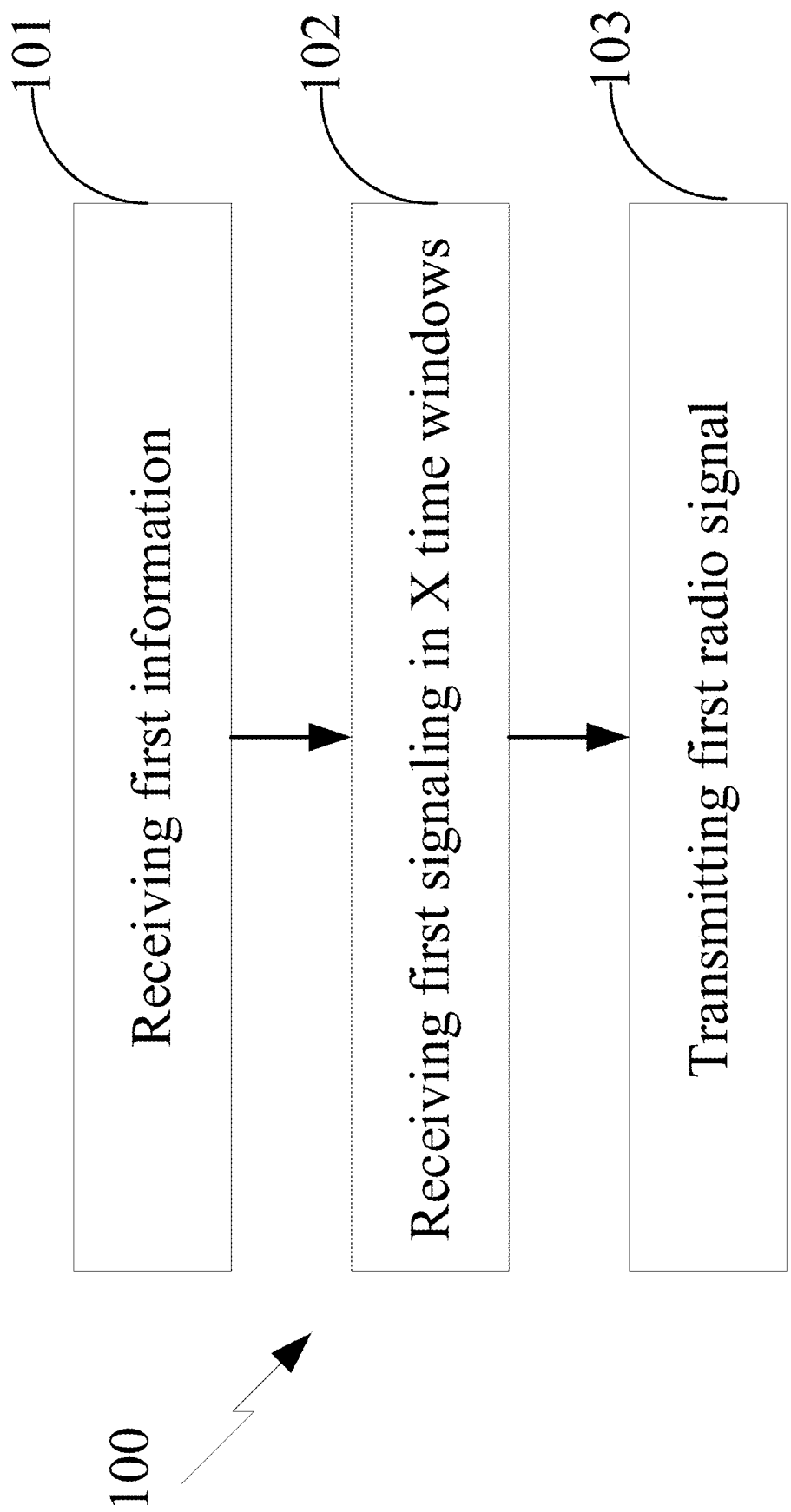
FIG. 1 illustrates a flowchart of first information, a first signaling and a first radio signal according to one embodiment of the present disclosure.

Embodiment 1 illustrates a flowchart of transmission of first information, a first signaling, and a first radio signal according to one embodiment of the present disclosure, as shown in FIG. 1. In FIG. 1, each box represents a step. In Embodiment 1, the first-type communication node in the present disclosure first receives first information; then receives a first signaling in X time windows; and transmits a first radio signal; the first information is used to determine X time windows, and time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information, the first signaling, the second information and the first radio signal are all transmitted through an air interface.

In one embodiment, the first information is transmitted through a Physical Broadcast Channel (PBCH).

In one embodiment, the first information comprises one or more Fields in a Master Information Block (MIB).

In one embodiment, the first information is transmitted through a Downlink Shared Channel (DL-SCH).

In one embodiment, the first information is transmitted through a Physical Downlink Shared Channel (PDSCH).

In one embodiment, the first information comprises one or more Fields in a System Information Block (SIB).

In one embodiment, the first information comprises one or more Fields in Remaining System Information (RMSI).

In one embodiment, the first information comprises all or part of a Radio Resource Control (RRC) signaling.

In one embodiment, the first information comprises all or part of a higher-layer signaling.

In one embodiment, the first information comprises all or part of a physical-layer signaling.

In one embodiment, a transmitter of the first information determines the X time windows according to the height of the satellite or the aircraft.

In one embodiment, the X time windows are orthogonal.

In one embodiment, the X time windows are non-orthogonal.

In one embodiment, time lengths of any two of the X time windows are equal.

In one embodiment, there are time lengths of two of the X time windows being unequal.

In one embodiment, any of the X time windows occupies continuous time-domain resources.

In one embodiment, there is no time-domain resource belonging to two of the X time windows at the same time.

In one embodiment, there is a time-domain resource belonging to two of the X time windows at the same time.

In one embodiment, the first-type communication node performs blind detection on the first signaling in the X time windows.

In one embodiment, the X time windows are respectively X windows within which the first-type communication node monitors PDCCH corresponding to a Random Access Radio Network Temporary Identity (RA-RNTI).

In one embodiment, receiving the first signaling in the X time windows means that the first-type communication node performs blind detection on the first signaling in the X time windows and successfully detects the first signaling.

In one embodiment, there is(are) a positive integer number of candidate(s) for the first signaling in the X time windows, and the first-type communication node performs blind detection on the positive integer number of candidate(s) for the the first signaling and successfully detects the first signaling.

In one embodiment, the first signaling is transmitted through a Physical Downlink Control Channel (PDCCH).

In one embodiment, the first signaling is transmitted through a PDCCH identified by a RA-RNTI.

In one embodiment, the first signaling is transmitted through a PDCCH scrambled by a Cyclic Redundancy Check (CRC) by a RA-RNTI.

In one embodiment, the first signaling comprises all or part of Fields of Downlink Control Information (DCI).

In one embodiment, the first signaling is a physical-layer signaling.

In one embodiment, the first signaling is a higher-layer signaling.

In one embodiment, the first signaling is transmitted through a Physical Downlink Shared Channel (PDSCH).

In one embodiment, the first signaling is a dynamic signaling.

In one embodiment, the first signaling is groupcast.

In one embodiment, the first signaling is transmitted in Common Search Space (CSS) of a PDCCH.

In one embodiment, the first signaling is DCI for scheduling a Msg-2 (Message-2 in random access process).

In one embodiment, the first signaling carries all or part of information of a Msg-2.

In one embodiment, the first radio signal is transmitted through an Uplink Shared Channel (UL-SCH).

In one embodiment, the first radio signal is transmitted through a Physical Uplink Shared Channel (PUSCH).

In one embodiment, the first radio signal is a PUSCH carrying a Msg-3 (Message-3 in random access process).

In one embodiment, the first radio signal is a PUSCH other than a PUSCH carrying a Msg-3.

In one embodiment, the first radio signal is generated by a first bit block successively through Segmentation, Channel Coding, Rate Matching, Concatenation, Scrambling, Modulation, Layer Mapping, Precoding, Resource Mapping, Baseband Signal Generation and Upconversion; the first bit block comprises all or part of bits in a Transport Block.

In one embodiment, the phrase that the first information is used to determine the X time windows refers to that the first information indicates the X.

In one embodiment, the phrase that the first information is used to determine the X time windows refers to that the first information indicates at least one of the X, time lengths of the X time windows or time-domain positions of the X time windows.

In one embodiment, the first information is used by the first-type communication node to determine the X time windows.

In one embodiment, the first information indicates the X time windows.

In one embodiment, the time-domain resource occupied by the first signaling refers to a time-domain resource occupied by a physical-layer wireless channel or a radio signal transmitting the first signaling.

In one embodiment, the time-domain resource occupied by the first signaling refers to an Orthogonal Frequency Division Multiplexing (OFDM) symbol occupied by a physical-layer wireless channel or a radio signal transmitting the first signaling.

In one embodiment, the first transmission timing adjustment and the second transmission timing adjustment are both real numbers in the case of units are respectively given.

In one embodiment, the first transmission timing adjustment is a non-negative number.

In one embodiment, the second transmission timing adjustment is a non-negative number.

In one embodiment, the second transmission timing adjustment is a negative number.

In one embodiment, the second transmission timing adjustment is equal to 0.

In one embodiment, a unit of measurement of the first transmission timing adjustment is the same as that of the second transmission timing adjustment.

In one embodiment, a unit of measurement of the first transmission timing adjustment is different from that of the second transmission timing adjustment.

In one embodiment, the first transmission timing adjustment is measured by millisecond.

In one embodiment, the first transmission timing adjustment is measured by microsecond.

In one embodiment, the second transmission timing adjustment is measured by microsecond.

In one embodiment, the second transmission timing adjustment is measured by millisecond.

In one embodiment, when the first transmission timing adjustment and the second transmission timing adjustment are converted into a same unit of measurement, the first transmission timing adjustment is greater than the second transmission timing adjustment.

In one embodiment, when the first transmission timing adjustment and the second transmission timing adjustment are converted into a same unit of measurement, the first transmission timing adjustment is smaller than the second transmission timing adjustment.

In one embodiment, the start time for the transmission of the first radio signal is linearly related to the first transmission timing adjustment and the second transmission timing adjustment.

In one embodiment, the start time for the transmission of the first radio signal is positively linear with the first transmission timing adjustment.

In one embodiment, the start time for the transmission of the first radio signal is negatively linear with the first transmission timing adjustment.

In one embodiment, the start time for the transmission of the first radio signal is positively linear with the second transmission timing adjustment.

In one embodiment, the start time for the transmission of the first radio signal is negatively linear with the second transmission timing adjustment.

In one embodiment, the start time for the transmission of the first radio signal is related to the first transmission timing adjustment and the second transmission timing adjustment, which means that the first transmission timing adjustment and the second transmission timing adjustment determine the start time for the transmission of the first radio signal through a given mapping relationship.

In one embodiment, the first signaling is used by the first-type communication node to determine the first transmission timing adjustment.

In one embodiment, the phrase that the first signaling is used to determine the first transmission timing adjustment refers to that the first signaling is indirectly used to determine the first transmission timing adjustment.

In one embodiment, the phrase that the first signaling is used to determine the first transmission timing adjustment refers to that the first signaling is directly used to determine the first transmission timing adjustment.

In one embodiment, the phrase that the first signaling is used to determine the first transmission timing adjustment refers to that the first signaling directly indicates the first transmission timing adjustment.

In one embodiment, the phrase that the first signaling is used to determine the first transmission timing adjustment refers to that the first signaling indirectly indicates the first transmission timing adjustment.

In one embodiment, the phrase that the first signaling is used to determine the first transmission timing adjustment refers to that the first signaling implicitly indicates the first transmission timing adjustment.

In one embodiment, the second transmission timing adjustment is related to a position of the first time-domain resources in the X time windows, which means that the position of the first time-domain resources in the X time windows is used to determine the second transmission timing adjustment through a given mapping relationship.

In one embodiment, the second transmission timing adjustment is related to s position of the first time-domain resources in the X time windows, which means that the position of the first time-domain resources in the X time windows is used to determine the second transmission timing adjustment through a given mapping table.

In one embodiment, the position of the first time-domain resources in the X time windows refers to the relative time-domain position of the first time-domain resources in the X time windows.

In one embodiment, the position of the first time-domain resources in the X time windows refers to the relative time-domain position of the first time-domain resources in total time-domain resources occupied by the X time windows.

In one embodiment, the first time-domain resources only belongs to one of the X time windows, and the position of the first time-domain resources in the X time windows refers to the sequence order of a time window to which the first time-domain resources belongs among the X time windows.

In one embodiment, the first time-domain resources only belongs to one of the X time windows, and the position of the first time-domain resources in the X time windows refers to the index of a time window to which the first time-domain resources belongs in the X time windows.

In one embodiment, the air interface is wireless.

In one embodiment, the air interface comprises a wireless channel.

In one embodiment, the air interface is an interface between a second-type communication node and the first-type communication node.

In one embodiment, the air interface is a Uu interface.

Embodiment 2

Figure 2:
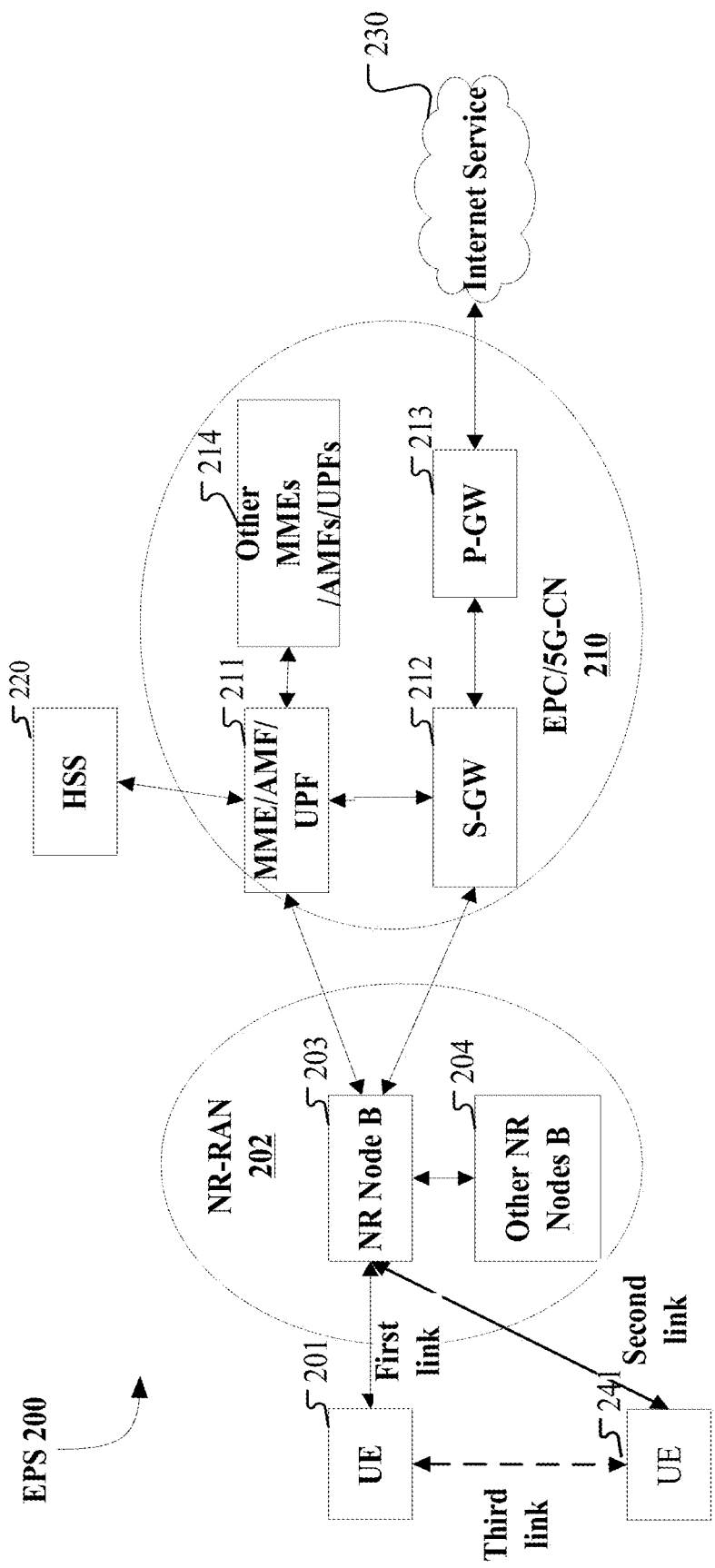
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 illustrates the network architecture 200 of NR 5G, Long-Term Evolution (LTE) and Long-Term Evolution Advanced (LTE-A) systems. The NR 5G or LTE network architecture 200 may be called an Evolved Packet System (EPS) 200. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS may be interconnected with other access networks. For simple description, the entities/interfaces are not shown. As shown in the figure, the EPS provides packet switching services. Those skilled in the art will find it easy to understand that various concepts presented throughout the present disclosure can be extended to networks providing circuit switching services or other cellular networks. The NG-RAN comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. In NTN network, the gNB 203 may be a satellite, an aircraft or a territorial base station relayed through a satellite. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first-type communication node in the present disclosure.

In one embodiment, the UE 201 supports transmission in Non-Terrestrial Network (NTN).

In one embodiment, the gNB 203 corresponds to the second-type communication node in the present disclosure.

In one embodiment, the gNB 203 supports transmission in Non-Terrestrial Network (NTN).

Embodiment 3

Figure 3:
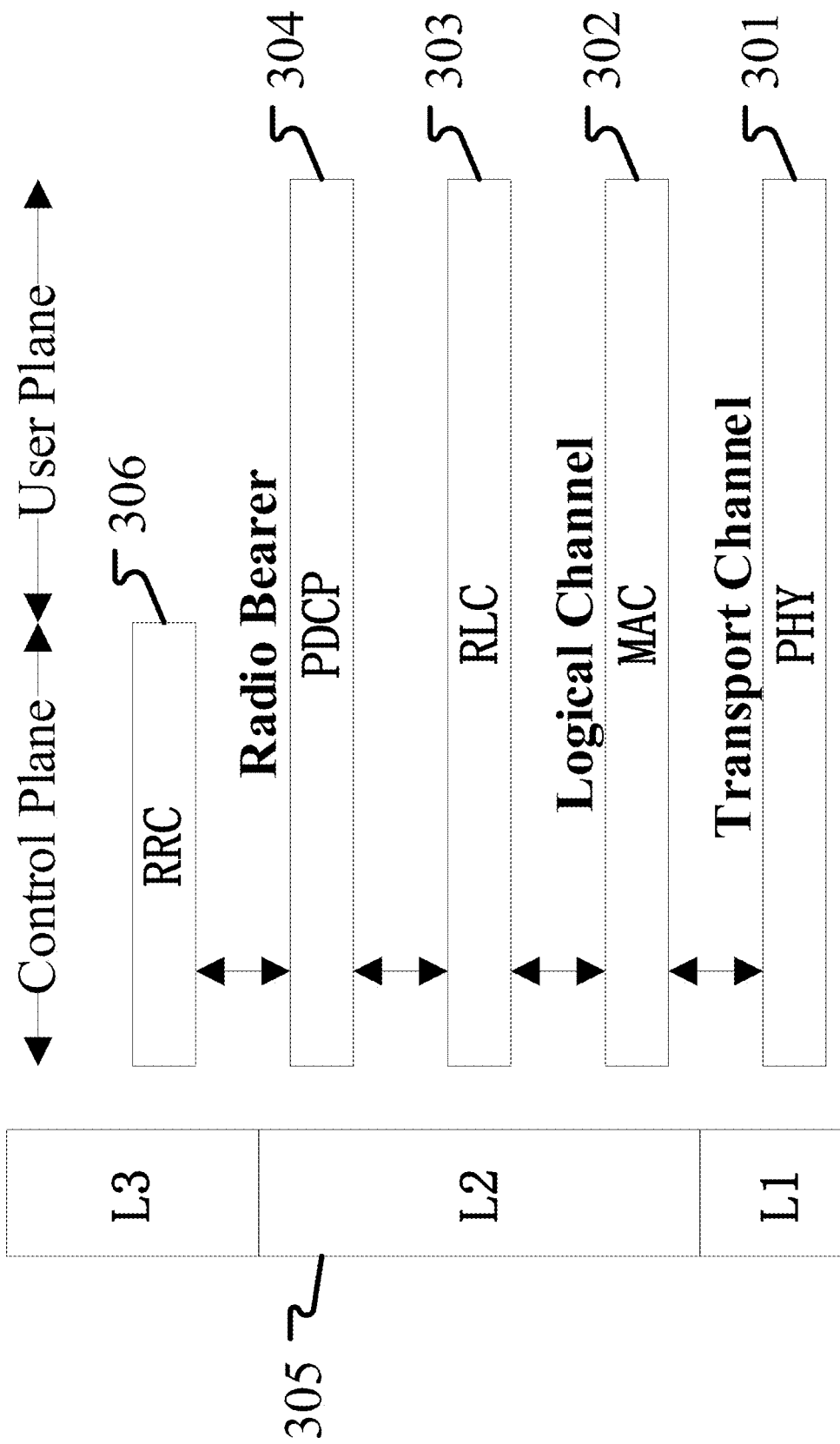
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane and a control plane. In FIG. 3, the radio protocol architecture for a first-type communication node (UE) and a second-type communication node (gNB, eNB or a satellite or an aircraft in NTN) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between a first-type communication node and a second-type communication node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at a second-type communication node of the network side. Although not described in FIG. 3, a first-type communication node may comprise several higher layers above the L2 305, such as a network layer (e.g., IP layer) terminated at a P-GW of the network side and an application layer terminated at the other side of the connection (e.g., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead, provides security by encrypting a packet, and provides support for first-type communication node handover between second-type communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first-type communication nodes various radio resources (e.g., resource block) in a cell. The MAC sublayer 302 is also in charge of HARQ operation. In the control plane, the radio protocol architecture of a first-type communication node and a second-type communication node is almost the same as the radio protocol architecture on the PHY 301 and the L2 305, but there is no header compression for the control plane. The control plane also comprises a Radio Resource Control (RRC) sublayer 306 in the layer 3 (L3). The RRC sublayer 306 is responsible for obtaining radio resources (i.e., radio bearer) and configuring a lower layer using an RRC signaling between a second-type communication node and a first-type communication node.

In one embodiment, the radio protocol architecture in FIG. 3 is applicable to the first-type communication node in the present disclosure.

In one embodiment, the radio protocol architecture in FIG. 3 is applicable to the second-type communication node in the present disclosure.

In one embodiment, the first information in the present disclosure is generated by the RRC 306.

In one embodiment, the first information in the present disclosure is generated by the MAC 302.

In one embodiment, the first information in the present disclosure is generated by the PHY301.

In one embodiment, the first signaling in the present disclosure is generated by the RRC 306.

In one embodiment, the first signaling in the present disclosure is generated by the PHY 301.

In one embodiment, the first radio signal in the present disclosure is generated by the RRC 306.

In one embodiment, the first radio signal in the present disclosure is generated by the MAC 302.

In one embodiment, the first radio signal in the present disclosure is generated by the PHY 301.

In one embodiment, the second radio signal in the present disclosure is generated by the RRC 306.

In one embodiment, the second radio signal in the present disclosure is generated by the PHY 301.

In one embodiment, the second information in the present disclosure is generated by the RRC 306.

In one embodiment, the second information in the present disclosure is generated by the MAC 302.

In one embodiment, the second information in the present disclosure is generated by the PHY 301.

In one embodiment, the third information in the present disclosure is generated by the RRC 306.

In one embodiment, the third information in the present disclosure is generated by the MAC 302.

In one embodiment, the third information in the present disclosure is generated by the PHY 301.

In one embodiment, the fourth information in the present disclosure is generated by the RRC 306.

In one embodiment, the fourth information in the present disclosure is generated by the MAC 302.

In one embodiment, the fourth information in the present disclosure is generated by the PHY 301.

Embodiment 4

Figure 4:
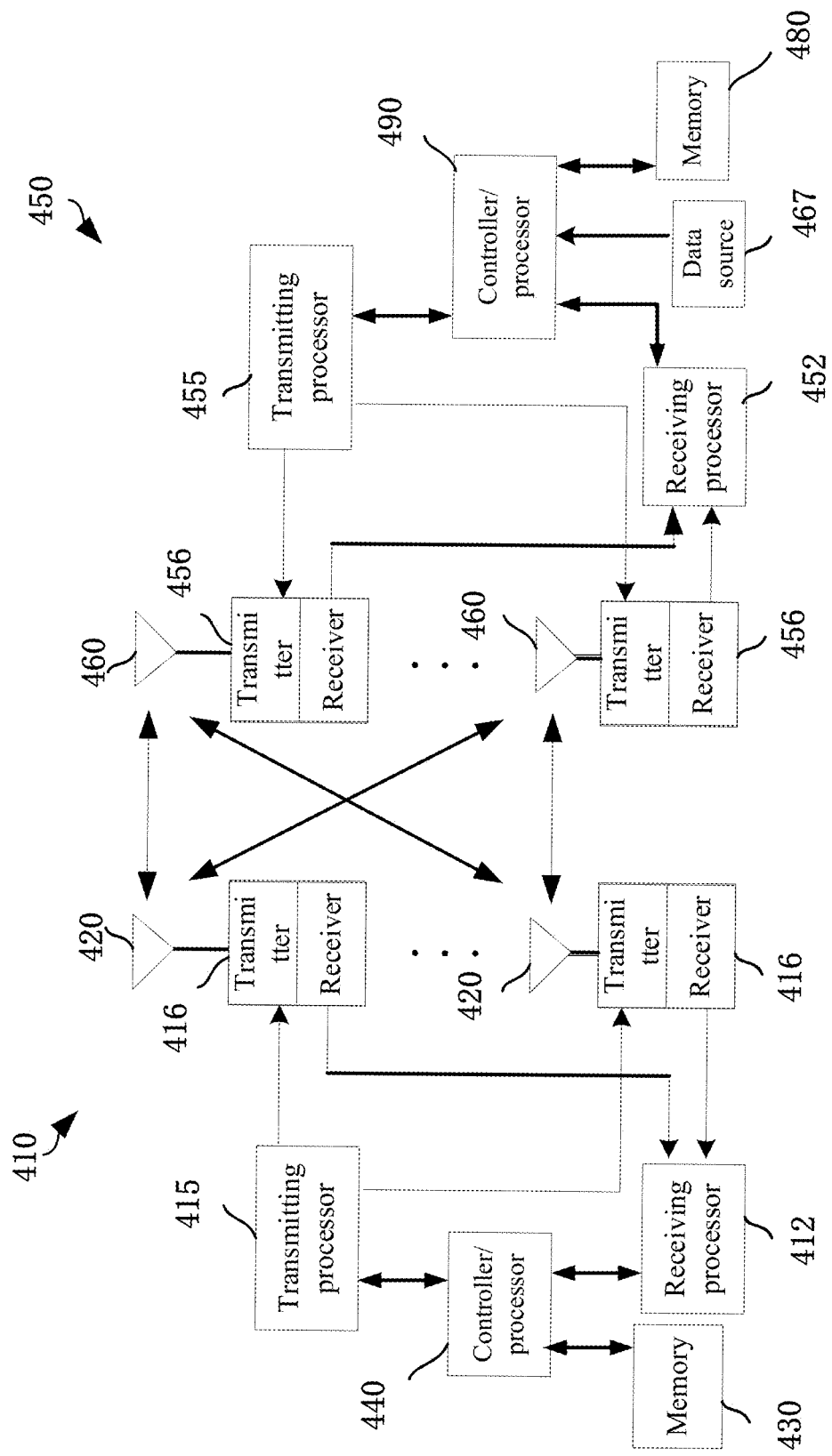
FIG. 4 illustrates a schematic diagram of a first-type communication node and a second-type communication node according to one embodiment of the present disclosure.

Embodiment 4 illustrates a schematic diagram of a base station and a given UE according to the present disclosure, as shown in FIG. 4. FIG. 4 is a block diagram of a gNB/eNB 410 in communication with a UE 450 in an access network.

The UE 450 comprises a controller/processor 490, a memory 480, a receiving processor 452, a transmitter/receiver 456, a transmitting processor 455 and a data source 467, a transmitter/receiver 456 and an antenna 460. A higher layer packet is provided to the controller/processor 490 by the data source 467, the controller/processor 490 provides header compression, encryption and decryption, packet segmentation connection and reordering, and a multiplexing between a logical channel and a transport channel so as to implement the L2 layer protocols used for the user plane and the control plane; the higher layer packet may comprise data or control information, such as a DL-SCH and a UL-SCH; the transmitting processor 455 performs various signal transmitting processing functions used for the L1 layer (that is, PHY), including coding, interleaving, scrambling, modulation, power control/allocation and generation of physical layer control signaling. The receiving processor 452 performs various signal receiving processing functions used for the L1 layer (that is, PHY), including decoding, deinterleaving, descrambling, demodulation, deprecoding and extraction of physical layer control signaling. The transmitter 456 is used to convert a baseband signal provided by the transmitting processor 455 into a radio-frequency signal and transmit it through the antenna 460, and the receiver 456 is used to convert a radio-frequency signal received through the antenna 460 into a baseband signal and provide it to the receiving processor 452.

A base station (410) may comprise a controller/processor 440, a memory 430, a receiving processor 412, a transmitter/receiver 416, a transmitting processor 415, and an antenna 420. A higher layer packet is provided to the controller/processor 440, the controller/processor 440 provides header compression and decompression, encryption and decryption, packet segmentation connection and reordering, as well as a multiplexing between a logical channel and a transport channel so as to implement the L2 layer protocols used for the user plane and the control plane; the higher layer packet may comprise data or control information, such as a DL-SCH or a UL-SCH. The transmitting processor 415 performs various signal transmitting processing functions used for the L1 layer (that is, PHY), including coding, interleaving, scrambling, modulation, power control/allocation, precoding and generation of physical-layer signalings (including a synchronization signal, a reference signal and etc.). The receiving processor 412 performs various signal receiving processing functions used for the L1 layer (that is, PHY), including decoding, deinterleaving, descrambling, demodulation, deprecoding and extraction of physical layer signaling. The transmitter 416 is used to convert a baseband signal provided by the transmitting processor 415 into a radio-frequency signal and transmit it through the antenna 420, and the receiver 416 is used to convert a radio-frequency signal received via the antenna 420 into a baseband signal and provide it to the receiving processor 412.

In Downlink (DL) transmission, a higher packet is provided to the controller/processor 440. The controller/processor 440 implements functions of L2 layer. In DL transmission, the controller/processor 440 provides header compression, encryption, packet segmentation and reordering, multiplexing between a logical channel and a transport channel, and radio resources allocation to the UE 450 based on various priorities. The controller/processor 440 is also responsible for HARQ operation, retransmission of a lost packet, and the generation of a signaling to the UE 450, such as first information, second information, third information and fourth information in the present disclosure are all generated at the controller/processor 440. The transmitting processor 415 implements various signal processing functions on the L1 layer (i.e., physical layer), including coding and interleaving to ensure an FEC (Forward Error Correction) at the UE 450 side, modulating a baseband signal based on various modulation schemes (e.g., Binary Phase Shift Keying (BPSK), Quadrature Phase Shift Keying (QPSK)), dividing the modulation symbols into parallel streams and mapping each stream to a corresponding multi-carrier subcarrier and/or a multi-carrier symbol, which are then transmitted in the form of a radio-frequency signal by the transmitting processor 415 mapping to the antenna 420 via the transmitter 416. A first signaling and first information, second information, third information and fourth information in the present disclosure are mapped to target air-interface resources by the transmitting processor 415 in the corresponding channel of the physical layer and then transmitted in the form of a radio-frequency signal by the transmitter 416 mapping to the antenna 420. At the receiving end, each receiver 456 receives a radio-frequency signal via its corresponding antenna 460, recovers baseband information modulated to a radio-frequency carrier, and supplies baseband information to the receiving processor 452. The receiving processor 452 implements various signal receiving and processing functions of the L1 layer. The signal receiving and processing function includes receiving a physical layer signal of the first information, the second information, the third information and the fourth information in the present disclosure; demodulating based on various modulation schemes (e.g., BPSK, and QPSK) via a multi-carrier symbol in a multi-carrier symbol stream; then decoding and de-interleaving to recover a data or a control signal transmitted by the gNB410 on a physical channel, and providing the data and the control signal to the controller/processor 490. The controller/processor 490 implements the function of L2 layer, and the controller/processor 490 interprets the first information, the second information, the third information and the fourth information in the present disclosure. The controller/processor can be connected to a memory 480 that stores program code and data. The memory 480 may be called a computer readable medium.

In uplink (UL) transmission, the data source 467 is used to provide related configuration data of a first radio signal to the controller/processor 490. The data source 467 represents all protocol layers above the L2 layer; the controller/processor 490 performs the L2 layer protocol for the user plane and the control plane by providing header compression, encryption, packet segmentation and reordering, as well as multiplexing between a logic channel and a transport channel through configuration allocation based on the gNB 410. The controller/processor 490 is also in charge of HARQ operation, retransmission of a lost packet, and a signaling to the gNB 410; the transmitting processor 455 performs various signal processing functions on the layer L1 (i.e., the physical layer). The signal receiving and processing function includes coding, modulation, and etc.; dividing modulation symbols into parallel streams and generating a baseband signal by mapping each stream to a corresponding multicarrier subcarrier and/or a multicarrier symbol, which are then transmitted in the form of a radio-frequency signal by the transmitting processor 455 mapping to the antenna 460 via the transmitter 456; signals of the physical layer (including the physical layer signals of the second radio signal in the present disclosure and the first radio signal in the present disclosure) are generated at the transmitting processor 455. The receiver 416 receives a radio-frequency signal via its corresponding antenna 420, and each receiver 416 recovers baseband information modulated to a radio-frequency carrier, and supplies the baseband information to the receiving processor 412. The receiving processor 412 implements various signal receiving and processing functions used for the L1 layer (i.e., physical layer), including the reception of physical layer signals of a first radio signal and a second radio signal in the present disclosure. The signal receiving and processing function includes obtaining a multi-carrier symbol stream, then demodulating a multi-carrier symbol in the multi-carrier symbol stream based on various modulation schemes, and then decoding to recover a data and/or a control signal originally transmitted by the UE 450 on a physical channel. The data and the control signal are then provided to the controller/processor 440. The controller/processor 440 performs functions of L2 layer. The controller/processor can be connected to a memory 430 that stores program code and data. The memory 430 may be called a computer readable medium.

In one embodiment, the UE 450 corresponds to the first-type communication node device in the present disclosure.

In one embodiment, the gNB 410 corresponds to the second-type communication node in the present disclosure.

In one embodiment, the UE 450 comprises at least one processor and at least one memory. The at least one memory comprises computer program codes; the at least one memory and the computer program codes are configured to be used in collaboration with the at least one processor. The UE 450 at least receives first information; receives a first signaling in X time windows; and transmits a first radio signal; the first information is used to determine X time windows, time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information, the first signaling, the second information and the first radio signal are all transmitted through an air interface.

In one embodiment, the UE 450 comprises a memory that stores a computer readable instruction program. The computer readable instruction program generates actions when executed by at least one processor, including: receiving first information; receiving a first signaling in X time windows; and transmitting a first radio signal; the first information is used to determine X time windows, time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to the position of the first time-domain resources in the X time windows; the first information, the first signaling, the second information and the first radio signal are all transmitted through an air interface.

In one embodiment, the gNB 410 comprises: at least one processor and at least one memory, the at least one memory comprises computer program codes; the at least one memory and the computer program codes are configured to be used in collaboration with the at least one processor. The gNB 410 at least: transmits first information; transmits a first signaling in X time windows; and receives a first radio signal; the first information is used to determine X time windows, time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to the position of the first time-domain resources in the X time windows; the first information, the first signaling, the second information and the first radio signal are all transmitted through an air interface.

In one embodiment, the gNB 410 comprises a memory that stores a computer readable instruction program. The computer readable instruction program generates actions when executed by at least one processor, including: transmitting first information; transmitting a first signaling in X time windows; and receiving a first radio signal; the first information is used to determine X time windows, and time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to the position of the first time-domain resources in the X time windows; the first information, the first signaling, the second information and the first radio signal are all transmitted through an air interface.

In one embodiment, the receiver 456 (including the antenna 460), the receiving processor 452 and the controller/processor 490 are used to receive the first information in the present disclosure.

In one embodiment, the receiver 456 (including the antenna 460), the receiving processor 452 and the controller/processor 490 are used to receive the second information in the present disclosure.

In one embodiment, the receiver 456 (including the antenna 460), the receiving processor 452 and the controller/processor 490 are used to receive the third information in the present disclosure.

In one embodiment, the receiver 456 (including the antenna 460), the receiving processor 452 and the controller/processor 490 are used to receive the fourth information in the present disclosure.

In one embodiment, the transmitter 456 (including the antenna 460), the transmitting processor 455 and the controller/processor 490 are used to transmit the first radio signal in the present disclosure.

In one embodiment, the transmitter 456 (including the antenna 460), the transmitting processor 455 and the controller/processor 490 are used to transmit the second radio signal in the present disclosure.

In one embodiment, the transmitter 416 (including the antenna 420), the transmitting processor 415 and the controller/processor 440 are used to transmit the first information in the present disclosure.

In one embodiment, the transmitter 416 (including the antenna 420), the transmitting processor 415 and the controller/processor 440 are used to transmit the second information in the present disclosure.

In one embodiment, the transmitter 416 (including the antenna 420), the transmitting processor 415 and the controller/processor 440 are used to transmit the third information in the present disclosure.

In one embodiment, the transmitter 416 (including the antenna 420), the transmitting processor 415 and the controller/processor 440 are used to transmit the fourth information in the present disclosure.

In one embodiment, the receiver 416 (including the antenna 420), the receiving processor 412 and the controller/processor 440 are used to receive the first radio signal in the present disclosure.

In one embodiment, the receiver 416 (including the antenna 420), the receiving processor 412 and the controller/processor 440 are used to receive the second radio signal in the present disclosure.

Embodiment 5

Figure 5:
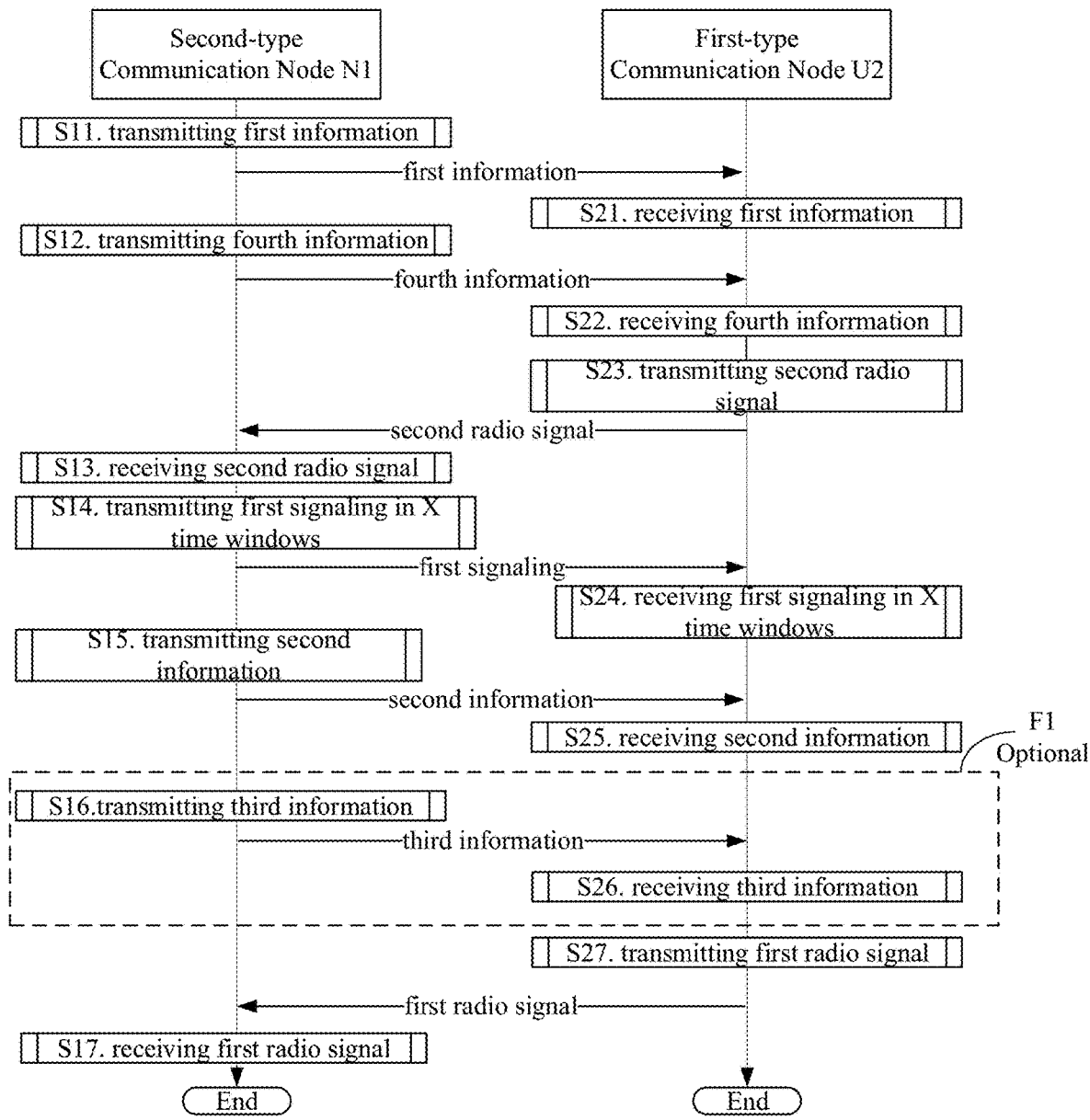
FIG. 5 illustrates a flowchart of radio signal transmission according to one embodiment of the present disclosure.

Embodiment 5 illustrates a radio signal transmission flow chart according to one embodiment in the present disclosure, as shown in FIG. 5. In FIG. 5, a second-type communication node N1 is a maintenance base station of a serving cell of a first-type communication node U2, and steps in the dotted box are optional.

The second-type communication node N1 transmits first information in step S11; transmits fourth information in step S12; receives a second radio signal in step S13; transmits a first signaling in X time windows in step S14; transmits second information in step S15; transmits third information in step S16; and receives a first radio signal in step S17.

The first-type communication node U2 receives first information in step S21; receives fourth information in step S22; transmits a second radio signal in step S23; receives a first signaling in X time windows in step S24; receives second information in step S25; receives third information in step S26; and transmits a first radio signal in step S27.

In Embodiment 5, the first information is used to determine X time windows, and time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information, the first signaling, the second information and the first radio signal are all transmitted through an air interface; the second information is used to determine the first transmission timing adjustment, and the first signaling is used to determine time-frequency resources occupied by a transmission of the second information, the second information being transmitted through the air interface; air-interface resources occupied by the second radio signal are used to determine a first characteristic identity, and the first signaling carries the first characteristic identity; an end time for a transmission of the second radio signal is used to determine start times of the X time windows, and the second radio signal is transmitted through the air interface; the start time for the transmission of the first radio signal is a first time, and an expected start time for a reception of the first radio signal is a second time; a sum of the first transmission timing adjustment and the second transmission timing adjustment is used to determine a time length of a time interval between the first time and the second time; the third information is used to determine the second time, and the third information is transmitted through the air interface; the fourth information is used to determine a time length of one of the X time windows.

In one embodiment, any two of the X time windows are orthogonal in time domain; the first signaling belongs to a first time window, and the first time window is one of the X time windows; the second transmission timing adjustment is one of Q candidate timing adjustments, the Q being a positive integer greater than 1, and a position of the first time window among the X time windows is used to determine the second transmission timing adjustment out of the Q candidate timing adjustments.

In one embodiment, the second information is transmitted through a Downlink Shared Channel (DL-SCH).

In one embodiment, the second information is transmitted through a Physical Downlink Shared Channel (PDSCH).

In one embodiment, the second information comprises all or part of information of a Random Access Response (RAR).

In one embodiment, the second information comprises all or part of information of a Msg-2 (i.e., Message-2 in random access process).

In one embodiment, the second information comprises all or part of information of a Timing Advance (TA) update.

In one embodiment, the second information comprises all or part of information of a Medium Access Control (MAC) signaling.

In one embodiment, the second information comprises all or part of information of a MAC Control Element (CE).

In one embodiment, the second information is used by the first-type communication node to determine the first transmission timing adjustment.

In one embodiment, the second information indicates the first transmission timing adjustment.

In one embodiment, the first signaling is used by the first-type communication node to determine time-frequency resources occupied by a transmission of the second information.

In one embodiment, the first signaling indicates time-frequency resources occupied by a transmission of the second information.

In one embodiment, time-frequency resources occupied by the second information refer to time-frequency resources occupied by a physical channel or a signal transmitting the second information.

In one embodiment, the first signaling also indicates a Modulation Coding Scheme (MCS) used by a physical channel or a signal transmitting the second information.

In one embodiment, the third information and the second information are transmitted through a same physical channel.

In one embodiment, the third information and the second information are transmitted through different physical channels.

In one embodiment, the second information and the third information both carry part of information of a RAR.

In one embodiment, the third information comprises an UL Grant in a RAR.

In one embodiment, the third information comprises one or more Fields of Downlink Control Information (DCI).

In one embodiment, the third information is transmitted through a Physical Downlink Control Channel (PDCCH).

In one embodiment, the third information indicates the second time.

In one embodiment, the third information is used by the first-type communication node to determine the second time.

In one embodiment, a time length of the X time windows is equal to a first time length, and the fourth information is used to determine the first time length.

In one embodiment, there are two of the X time windows with different time lengths, and the fourth information is used to determine a time length of each of the X time windows.

In one embodiment, the fourth information indicates a time length of one of the X time windows.

In one embodiment, the fourth information is used by the first-type communication node to determine a time length of one of the X time windows.

In one embodiment, the fourth information and the first information are transmitted through a same physical channel.

In one embodiment, the fourth information and the first information are transmitted through different physical channels.

In one embodiment, the fourth information and the first information are two different Fields in a same signaling.

In one embodiment, the fourth information and the first information are two different Information Elements (IE) in a same Radio Resource Control (RRC) signaling.

In one embodiment, the fourth information and the first information are carried by two different signalings.

In one embodiment, the fourth information and the first information are carried by two different RRC signalings.

In one embodiment, the fourth information is transmitted through a Physical Broadcast Channel (PBCH).

In one embodiment, the fourth information comprises one or more Fields of a Master Information Block (MIB).

In one embodiment, the fourth information is transmitted through a Downlink Shared Channel (DL-SCH).

In one embodiment, the fourth information is transmitted through a Physical Downlink Shared Channel (PDSCH).

In one embodiment, the fourth information comprises one or more Fields of a System Information Block (SIB).

In one embodiment, the fourth information comprises one or more Fields of Remaining System Information (RMSI).

In one embodiment, the fourth information comprises all or part of a Radio Resource Control (RRC) signaling.

In one embodiment, the fourth information comprises all or part of a higher-layer signaling.

In one embodiment, the fourth information comprises all or part of a physical-layer signaling.

Embodiment 6

Figure 6:
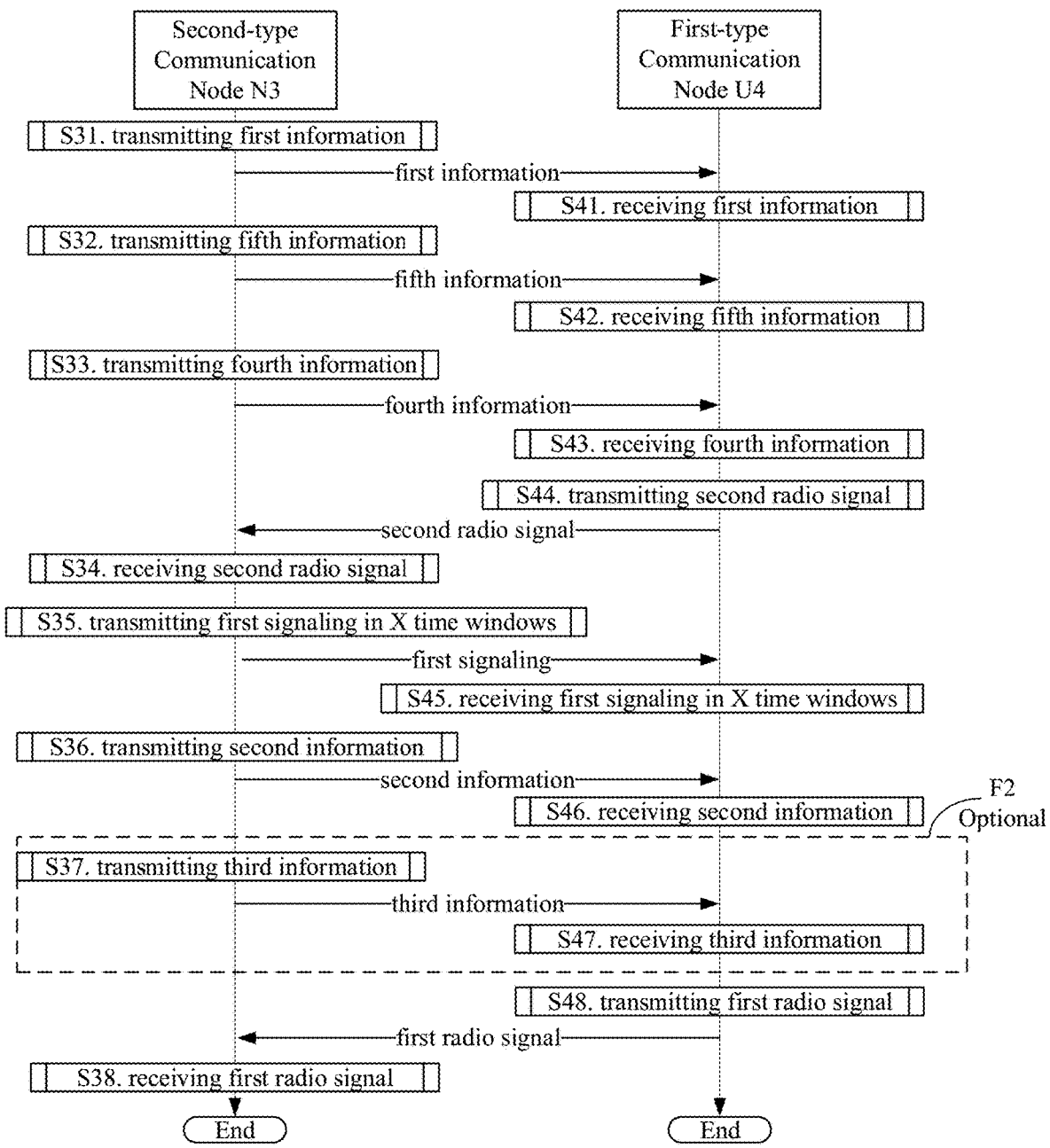
FIG. 6 illustrates another flowchart of radio signal transmission according to one embodiment of the present disclosure.

Embodiment 6 illustrates another radio signal transmission flow chart according to one embodiment in the present disclosure, as shown in FIG. 6. In FIG. 6, a second-type communication node N3 is a maintenance base station of a serving cell of a first-type communication node U4, and steps in the dotted box are optional.

The second-type communication node N3 transmits first information in step S31; transmits fourth information in step S32; transmits fifth information in step S33; receives a second radio signal in step S34; and transmits a first signaling in X time windows in step S35; transmits second information in step S36; transmits third information in step S37; and receives a first radio signal in step S38.

The first-type communication node U4 receives first information in step S41; receives fourth information in step S42; receives fifth information in step S43; transmits a second radio signal in step S44; receives a first signaling in X time windows in step S45; receives second information in step S46, receives third information in step S47; and transmits a first radio signal in step S48.

In Embodiment 6, the first information is used to determine X time windows, and time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to the position of the first time-domain resources in the X time windows; the first information, the first signaling, the second information and the first radio signal are all transmitted through an air interface; the second information is used to determine the first transmission timing adjustment, and the first signaling is used to determine time-frequency resources occupied by a transmission of the second information, the second information being transmitted through the air interface; air-interface resources occupied by the second radio signal are used to determine a first characteristic identity, and the first signaling carries the first characteristic identity; an end time for a transmission of the second radio signal is used to determine start times of the X time windows, and the second radio signal is transmitted through the air interface; the start time the for transmission of the first radio signal is a first time, and an expected start time for a reception of the first radio signal is a second time; a sum of the first transmission timing adjustment and the second transmission timing adjustment is used to determine a time length of a time interval between the first time and the second time; the third information is used to determine the second time, and the third information is transmitted through the air interface; the fourth information is used to determine a time length of one of the X time windows; the fifth information indicates a reference timing adjustment, and the second information indicates a timing adjustment offset; a sum of the reference timing adjustment and the timing adjustment offset is equal to the first transmission timing adjustment, and the fifth information is transmitted through the air interface.

In one embodiment, the reference timing adjustment is related to a height of a transmitter of the fifth information.

In one embodiment, the reference timing adjustment is linearly related to a height of a transmitter of the fifth information.

In one embodiment, the reference timing adjustment is proportional to a height of a transmitter of the fifth information.

In one embodiment, the reference timing adjustment is related to a height of the satellite and a delay of the Feeder Link.

In one embodiment, the timing adjustment offset is a positive real number measured in a given unit.

In one embodiment, the timing adjustment offset is a negative real number measured in a given unit.

In one embodiment, the timing adjustment offset is equal to 0.

In one embodiment, the reference timing adjustment is a real number measured in a given unit.

In one embodiment, the fifth information is transmitted through a Physical Broadcast Channel (PBCH).

In one embodiment, the fifth information comprises one or more Fields of a Master Information Block (MIB).

In one embodiment, the fifth information comprises one or more Fields of a System Information Block (SIB).

In one embodiment, the fifth information comprises one or more Fields of Remaining System Information (RMSI).

In one embodiment, the fifth information comprises all or part of information of a Random Access Response (RAR).

In one embodiment, the fifth information comprises all or part of information of a Msg-2 (i.e., Message-2 in random access process).

In one embodiment, the fifth information and the second information are transmitted through a same physical channel.

In one embodiment, the fifth information and the second information are transmitted through two different physical channels.

Embodiment 7

Figure 7:
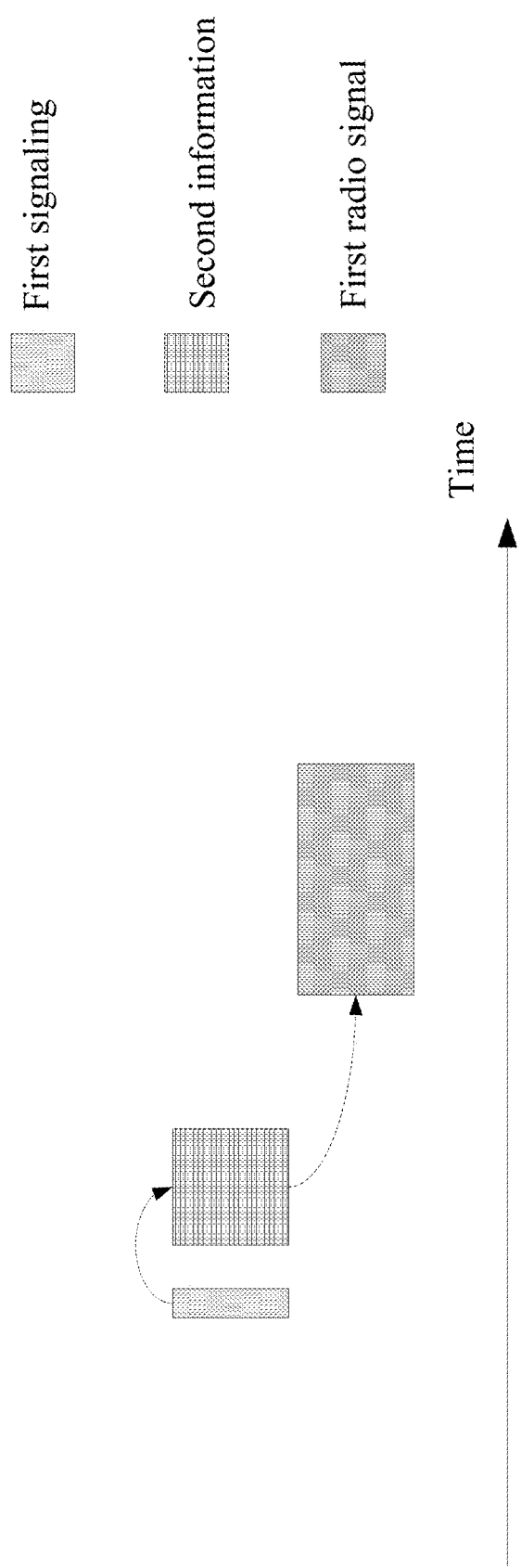
FIG. 7 illustrates a schematic diagram of the relationship between a first signaling and second information according to one embodiment of the present disclosure.

Embodiment 7 illustrates a schematic diagram of the relationship between a first signaling and second information according to one embodiment of the present disclosure, as shown in FIG. 7. In FIG. 7, the horizontal axis represents time, the rectangle filled with slashes represents a first signaling, the rectangle filled with reticles represents second information, and the rectangle filled with cross lines represents a first radio signal.

In Embodiment 7, the second information in the present disclosure is used to determine the first transmission timing adjustment in the present disclosure, and the first signaling in the present disclosure is used to determine time-frequency resources occupied by a transmission of the second information; the second information is transmitted through the air interface; a start time for a transmission of the first radio signal in the present disclosure is related to the first transmission timing adjustment and the second transmission timing adjustment in the present disclosure.

In one embodiment, the second information is transmitted through a Downlink Shared Channel (DL-SCH).

In one embodiment, the second information is transmitted through a Physical Downlink Shared Channel (PDSCH).

In one embodiment, the second information comprises all or part of information of a Random Access Response (RAR).

In one embodiment, the second information comprises all or part of information of a Msg-2 (Message-2 in random access process).

In one embodiment, the second information comprises all or part of information of a Timing Advance (TA) update.

In one embodiment, the second information comprises all or part of information of a Medium Access Control (MAC) signaling.

In one embodiment, the second information comprises all or part of information of a MAC Control Element (CE).

In one embodiment, the second information is used by the first-type communication node to determine the first transmission timing adjustment.

In one embodiment, the second information indicates the first transmission timing adjustment.

In one embodiment, the first signaling is used by the first-type communication node to determine time-frequency resources occupied by a transmission of the second information.

In one embodiment, the first signaling indicates time-frequency resources occupied by the transmission of second information.

In one embodiment, time-frequency resources occupied by the second information refer to time-frequency resources occupied by a physical channel or a signal transmitting the second information.

In one embodiment, the first signaling also indicates a Modulation Coding Scheme (MCS) used by a physical channel or a signal transmitting the second information.

Embodiment 8

Figure 8:
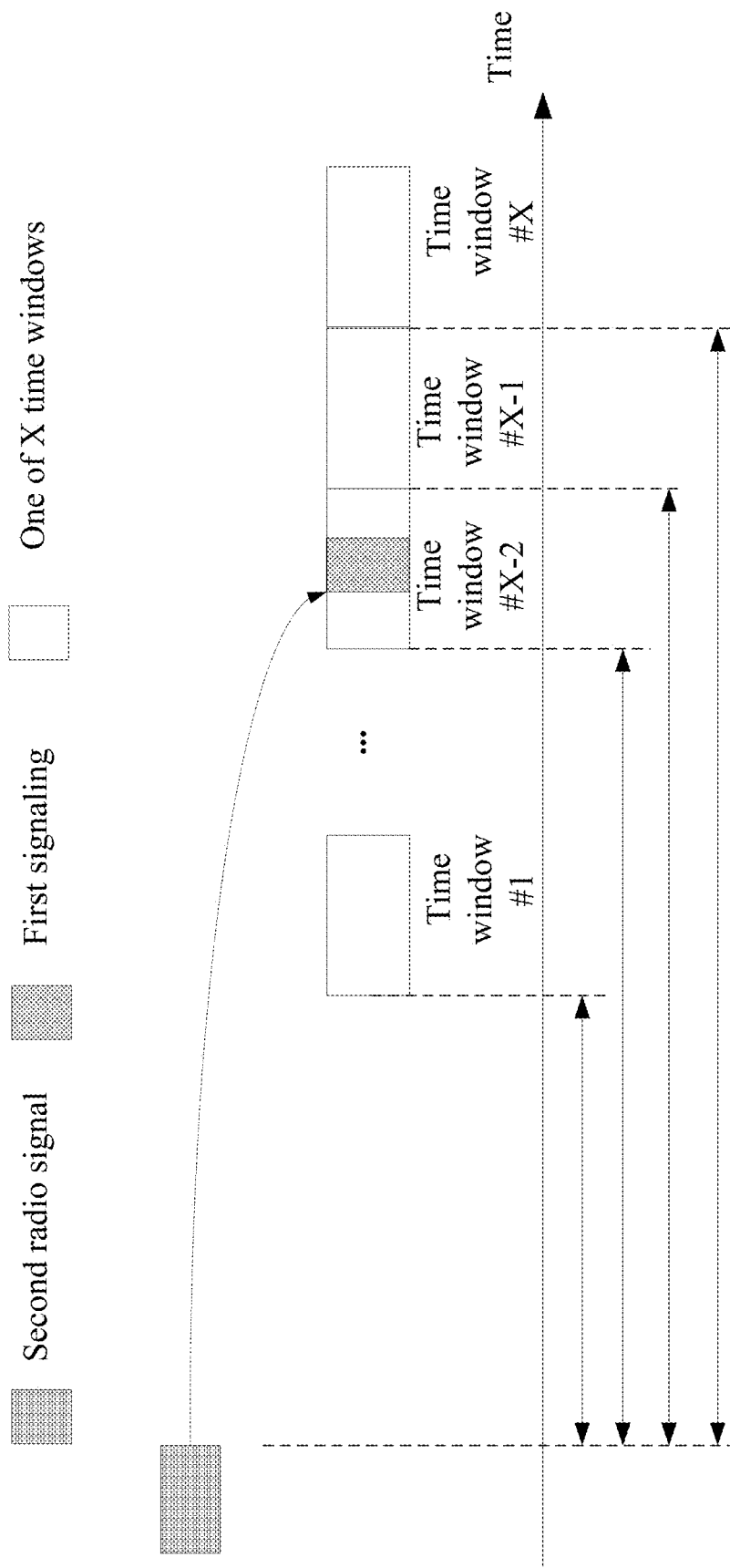
FIG. 8 illustrates a schematic diagram of the relationship between a second radio signal and a first signaling according to one embodiment of the present disclosure.

Embodiment 8 illustrates a schematic diagram of the relationship between a second radio signal and a first signaling according to one embodiment of the present disclosure, as shown in FIG. 8. In FIG. 8, the horizontal axis represents time, the rectangle filled with reticles represents a second radio signal, the rectangle filled with cross lines represents a first signaling, and each unfilled rectangle in bold represents one of X time windows.

In Embodiment 8, air-interface resources occupied by the second radio signal in the present disclosure are used to determine a first characteristic identity, and the first signaling in the present disclosure carries the first characteristic identity; an end time for a transmission of the second radio signal is used to determine start times of the X time windows; the first signaling belongs to the X time windows, and the second radio signal is transmitted through the air interface.

In one embodiment, the second radio signal is transmitted through a PRACH.

In one embodiment, the second radio signal carries a Preamble.

In one embodiment, the second radio signal is transmitted through a Random Access Channel (RACH).

In one embodiment, the second radio signal is generated by a characteristic sequence, which is either a Zadoff-Chu (ZC) sequence or a pseudo-random sequence.

In one embodiment, the second radio signal is generated by a characteristic sequence, which is one of an integer number of orthogonal sequence(s) or non-orthogonal sequence(s).

In one embodiment, air-interface resources occupied by the second radio signal refer to at least one of time-frequency resources or code-domain resources.

In one embodiment, air-interface resources occupied by the second radio signal refer to at least one of a characteristic sequence for generating the second radio signal or time-frequency resources occupied for the transmission of the second radio signal.

In one embodiment, the first characteristic identity is a 16-bit binary non-negative integer.

In one embodiment, the first characteristic identity is a RA-RNTI.

In one embodiment, air-interface resources occupied by the second radio signal are used by the first-type communication node to determine the first characteristic identity.

In one embodiment, air-interface resources occupied by the second radio signal determine the first characteristic identity according to a given mapping rule.

In one embodiment, air-interface resources occupied by the second radio signal determine the first characteristic identity according to the following operation:

$$\text{RA-RNTI}=1+s\_id+14*t\_id+14*X*f\_id+14*X*Y*ul\_carrier\_id$$

wherein the RNTI represents the first characteristic identity, s_id is an index of a first OFDM symbol in air-interface resources occupied by the second radio signal in a time slot to which the first OFDM symbol belongs; t_id is an index of a first slot comprised in or comprising air-interface resources occupied by the second radio signal in the system frame to which the first slot belongs; f_id is an index of the second radio signal in frequency domain; ul_carrier_id is an index of a uplink carrier to which the second radio signal belongs (the index is equal to 0 for a normal carrier and 1 for a supplementary uplink carrier); and values of the X and the Y are predefined or configurable.

In one embodiment, the first signaling carrying the first characteristic identity refers to that the first signaling explicitly carries the first characteristic identity.

In one embodiment, the first signaling carrying the first characteristic identity refers to that the first signaling implicitly carries the first characteristic identity.

In one embodiment, the first signaling carrying the first characteristic identity refers to that the first characteristic identity is used to generate a CRC of the first signaling.

In one embodiment, the first signaling carrying the first characteristic identity refers to that the first characteristic identity is used as a scrambling code for a CRC of the first signaling.

In one embodiment, an end time for a transmission of the second radio signal is used to determine a start time of one of the X time windows.

In one embodiment, an end time for a transmission of the second radio signal is used by the first-type communication node to determine start times of the X time windows.

In one embodiment, an end time for a transmission of the second radio signal is used to determine a start time of each of the X time windows.

In one embodiment, an end time for a transmission of the second radio signal is earlier than a start time of each of the X time windows.

In one embodiment, the phrase that an end time for a transmission of the second radio signal is used to determine the X time windows refers to: the first information indicates the X, and a time length of each of the X time windows is configurable, or a time length of each of the X time windows is predefined, there being a reference time window among the X time windows; an end time for a transmission of the second radio signal is used to determine a start time of the reference time window, and the position of the reference time window in the X time windows is predefined.

In one subsidiary embodiment of the above embodiment, a time interval from an end time for a transmission of the second radio signal to a start time of the reference time window is predefined.

In one subsidiary embodiment of the above embodiment, a time interval from an end time for a transmission of the second radio signal to a start time of the reference time window is fixed.

In one subsidiary embodiment of the above embodiment, a time interval from an end time for a transmission of the second radio signal to a start time of the reference time window is configurable.

In one subsidiary embodiment of the above embodiment, a time interval from an end time for a transmission of the second radio signal to a start time of the reference time window is related to the X.

In one embodiment, the phrase that an end time for a transmission of the second radio signal is used to determine the X time windows refers to: the first information indicates the X, and a time length of each of the X time windows is configurable, or a time length of each of the X time windows is predefined, there being a reference time window among the X time windows; an end time for a transmission of the second radio signal is used to determine a start time of the reference time window, and the position of the reference time window in the X time windows is related to the X.

In one subsidiary embodiment of the above embodiment, a time interval from an end time for a transmission of the second radio signal to a start time of the reference time window is predefined.

In one subsidiary embodiment of the above embodiment, a time interval from an end time for a transmission of the second radio signal to a start time of the reference time window is fixed.

In one subsidiary embodiment of the above embodiment, a time interval from an end time for a transmission of the second radio signal to a start time of the reference time window is configurable.

In one subsidiary embodiment of the above embodiment, a time interval from an end time for a transmission of the second radio signal to a start time of the reference time window is related to the X.

In one embodiment, a time interval between start times of any two of the X time windows is equal to a positive integral multiple of a time length of a detection period of a Synchronization/Physical Broadcast Channel Block (SS/PBCH Block).

In one embodiment, a time interval between start times of any two of the X time windows is equal to a positive integral multiple of 5 milliseconds.

In one embodiment, a time interval between start times of any two of the X time windows is equal to a positive integral multiple of a half frame.

In one embodiment, start times of the X time windows are X times equally spaced with a first interval length, and the first interval length is equal to a detection period of a SS/PBCH Block.

In one embodiment, start times of the X time windows are X times equally spaced with a first interval length, and the first interval length is equal to 5 milliseconds.

In one embodiment, start times of the X time windows are X times equally spaced with a first interval length, and the first interval length is equal to a time length of a Half-Frame.

In one embodiment, an end time for a transmission of the second radio signal is an end time of a last OFDM symbol occupied by the second radio signal.

In one embodiment, a start time of any of the X time windows is a start time of a first OFDM symbol of a Control-resource set (CORESET) of type-1 PDCCH public search space comprised in the time window.

Embodiment 9

Figure 9:
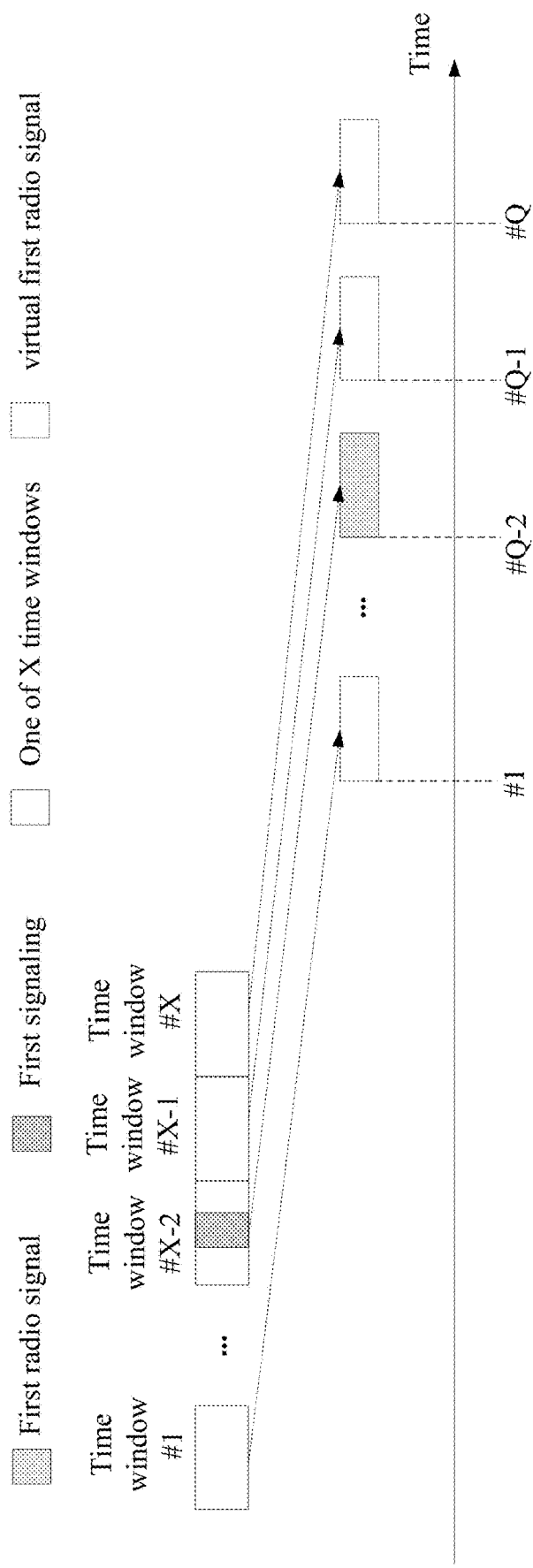
FIG. 9 illustrates a schematic diagram of the relationship between a first time window and a second transmission timing adjustment according to one embodiment of the present disclosure.

Embodiment 9 illustrates a schematic diagram of the relationship of a first time window and a second transmission timing adjustment according to one embodiment of the present disclosure, as shown in FIG. 9. In FIG. 9, the horizontal axis represents time, the rectangle filled with slashes represents a first radio signal, the rectangle filled with cross lines represents a first signaling, each unfilled rectangle in bold font represents one of X time windows, and each unfilled dotted rectangle represents a virtual first radio signal, wherein each virtual first radio signal is a radio signal calculated at assuming a start time for a transmission of a first radio signal according to one candidate timing adjustment other than a second transmission timing adjustment of Q candidate timing adjustments.

In Embodiment 9, any two of the X time windows in the present disclosure are orthogonal in time domain; the first signaling in the present disclosure belongs to a first time window, and the first time window is one of the X time windows; the second transmission timing adjustment in the present disclosure is one of Q candidate timing adjustments, the Q being a positive integer greater than 1, and a position of the first time window in the X time windows is used to determine the second transmission timing adjustment among the Q candidate timing adjustments.

In one embodiment, the Q is equal to the X.

In one embodiment, the Q is not equal to the X.

In one embodiment, the Q is less than the X.

In one embodiment, the phrase that any two of the X time windows are orthogonal in time domain refers to that there is no time domain resource belonging to any two of the X time windows at the same time.

In one embodiment, the first signaling is transmitted in the first time window.

In one embodiment, a position of the first time window among the X time windows refers to an index of the first time window in the X time windows.

In one embodiment, a position of the first time window among the X time windows refers to a relative order of the first time window among the X time windows.

In one embodiment, any of the Q candidate timing adjustments is a real number in a given time unit.

In one embodiment, any two of the Q candidate timing adjustments are unequal.

In one embodiment, the X time windows are mapped to the Q candidate timing adjustments according to a specific mapping relationship, and the phrase that a position of the first time window among the X time windows is used to determine the second transmission timing adjustment in the Q candidate timing adjustments refers to: the first time window determines the second transmission timing adjustment according to the specific mapping relationship.

In one embodiment, a position of the first time window among the X time windows is used by the first-type communication node to determine the second transmission timing adjustment in the Q candidate timing adjustments.

In one embodiment, the earlier the position of time domain of the first time window in the X time windows is, the larger the value of the second transmission timing adjustment is.

In one embodiment, the later the position of time domain of the first time window in the X time windows is, the smaller the value of the second transmission timing adjustment is.

In one embodiment, the X time windows are indexed in an ascending order according to the time sequence, and the Q candidate timing adjustments are indexed from small to large according to the order from small to large; an index of the second transmission timing adjustment in the Q candidate timing adjustments is linearly related to an index of the first time window in the X time windows.

In one embodiment, the X time windows are indexed in an ascending order according to the time sequence, and the Q candidate timing adjustments are indexed in an ascending order; an index of the second transmission timing adjustment in the Q candidate timing adjustments is negatively and linearly related to an index of the first time window in the X time windows.

In one embodiment, the X time windows are indexed in an ascending order according to the time sequence, and the Q candidate timing adjustments are indexed in an ascending order; an index of the second transmission timing adjustment in the Q candidate timing adjustments is in a monotonically decreasing relationship with an index of the first time window in the X time windows.

Embodiment 10

Figure 10:
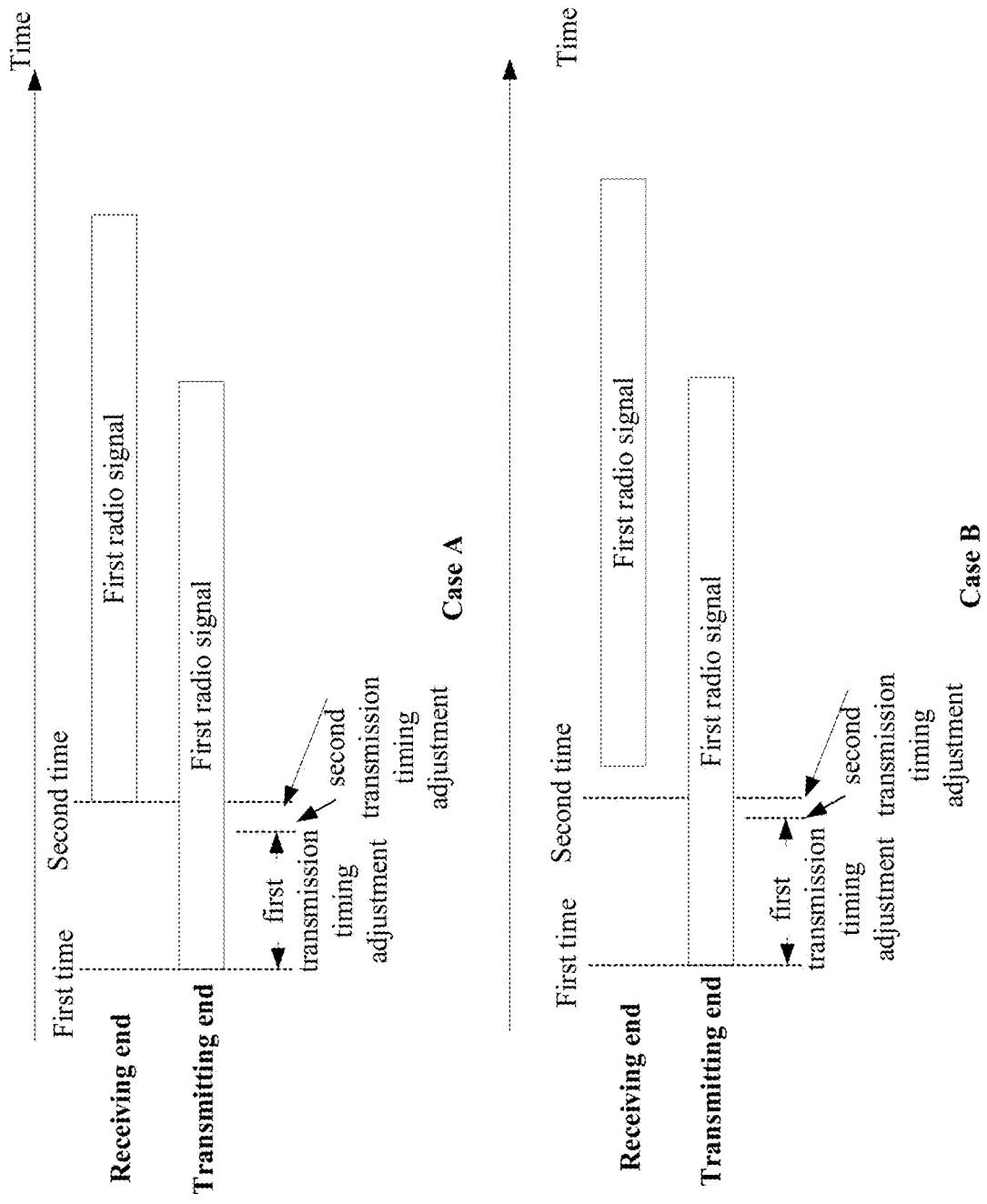
FIG. 10 illustrates a schematic diagram of a first time and a second time according to one embodiment of the present disclosure.

Embodiment 10 illustrates a schematic diagram of a first time and a second time according to one embodiment of the present disclosure, as shown in FIG. 10. In FIG. 10, the horizontal axis represents time; in case A, the second time is an expected start time for a reception of a first radio signal, and in case B, the second time is different from an expected start time for a reception of a first radio signal.

In Embodiment 10, the start time for a transmission of the first radio signal in the present disclosure is a first time, and an expected start time for a reception of the first radio signal is a second time; a sum of the first transmission timing adjustment in the present disclosure and the second transmission timing adjustment in the present disclosure is used to determine a time length of a time interval from the first time to the second time; the third information in the present disclosure is used to determine the second time, and the third information is transmitted through the air interface.

In one embodiment, the second time is different from an expected start time for a reception of the first radio signal.

In one embodiment, the second time is the same as an expected start time for a reception of the first radio signal.

In one embodiment, the second time is a start time for a reception of the first radio signal assumed by the first-type communication node.

In one embodiment, the second time is a start time for a reception of the first radio signal assumed by a transmitter of the first radio signal.

In one embodiment, the first time is earlier than the second time.

In one embodiment, the first time is not later than the second time.

In one embodiment, a time length of the time interval from the first time to the second time is a TA value of the first radio signal.

In one embodiment, a sum of the first transmission timing adjustment and the second transmission timing adjustment is a sum of the first transmission timing adjustment and the second transmission timing adjustment being converted into a same unit of measurement.

In one embodiment, a sum of the first transmission timing adjustment and the second transmission timing adjustment is used by the first-type communication node to determine a time length of a time interval from the first time to the second time.

In one embodiment, a sum of the first transmission timing adjustment and the second transmission timing adjustment is equal to a time length of a time interval from the first time to the second time.

Embodiment 11

Figure 11:
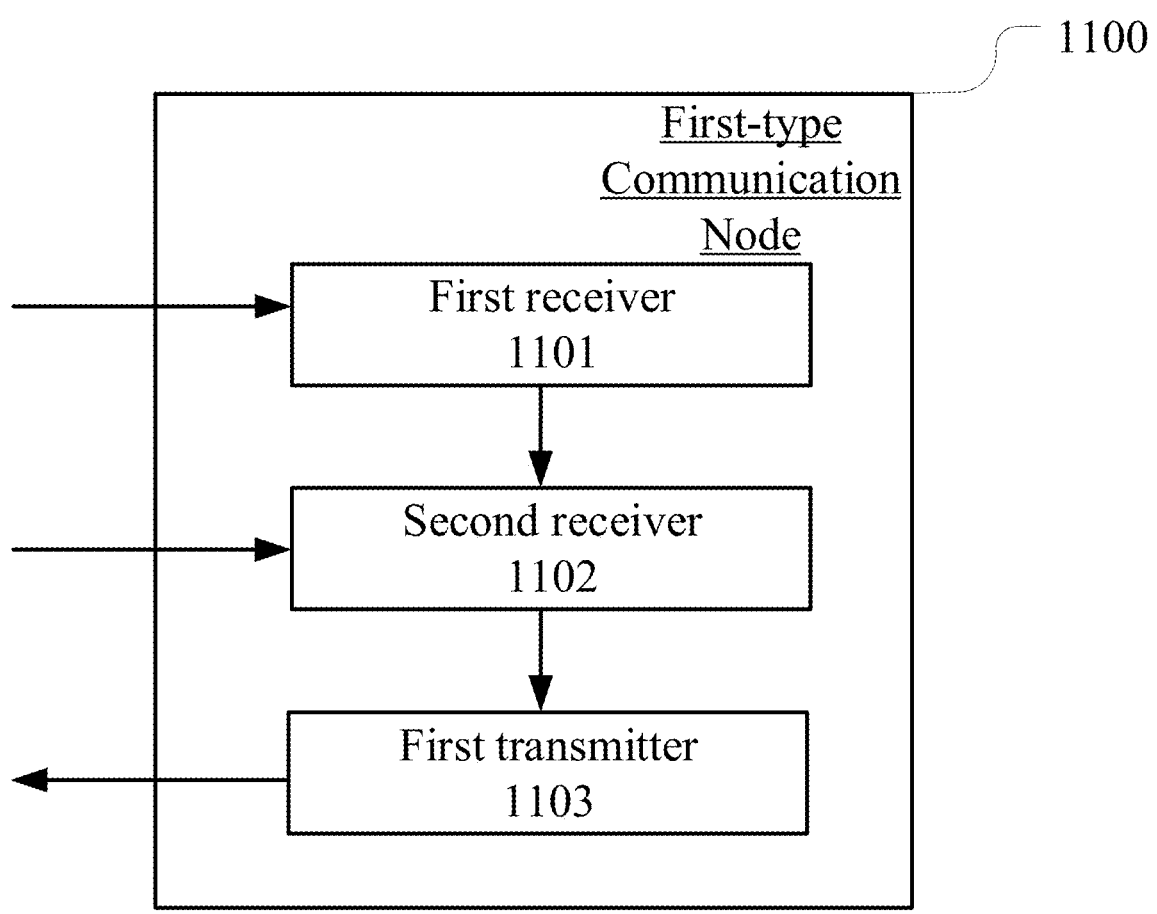
FIG. 11 illustrates a structure block diagram of a processing device in a first-type communication node according to one embodiment of the present disclosure.

Embodiment 11 illustrates a structure diagram of a processing device in a first-type communication node, as shown in FIG. 11. In FIG. 11, the first-type communication node processing device 1100 is mainly composed of a first receiver 1101, a second receiver 1102 and a first transmitter 1103. The first receiver 1101 comprises the transmitter/receiver 456 (including the antenna 460), the receiving processor 452 and the controller/processor 490 in FIG. 4 of the present disclosure; the second receiver 1102 comprises the transmitter/receiver 456 (including the antenna 460), the receiving processor 452 and the controller/processor 490 in FIG. 4 of the present disclosure; the first transmitter 1103 comprises the transmitter/receiver 456 (including the antenna 460), the transmitting processor 455 and the controller/processor 490 in FIG. 4 of the present disclosure;

In Embodiment 11, the first receiver 1101 receives first information; the second receiver 1102 receives a first signaling in X time windows; and the first transmitter 1103 transmits a first radio signal; wherein the first information is used to determine the X time windows, and time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information, the first signaling, the second information and the first radio signal are all transmitted through an air interface.

In one embodiment, the second receiver 1102 also receives second information; the second information is used to determine the first transmission timing adjustment, and the first signaling is used to determine time-frequency resources occupied by a transmission of the second information, the second information being transmitted through the air interface.

In one embodiment, the first transmitter 1103 also transmits a second radio signal; air-interface resources occupied by the second radio signal are used to determine a first characteristic identity, and the first signaling carries the first characteristic identity; an end time for a transmission of the second radio signal is used to determine start times of the X time windows, and the second radio signal is transmitted through the air interface.

In one embodiment, any two of the X time windows are orthogonal in time domain; the first signaling belongs to a first time window, and the first time window is one of the X time windows; the second transmission timing adjustment is one of Q candidate timing adjustments, the Q being a positive integer greater than 1, and a position of the first time window among the X time windows is used to determine the second transmission timing adjustment out of the Q candidate timing adjustments.

In one embodiment, the second receiver 1102 also receives third information; the start time for the transmission of the first radio signal is a first time, and an expected start time for a reception of the first radio signal is a second time; a sum of the first transmission timing adjustment and the second transmission timing adjustment is used to determine a time length of a time interval between the first time and the second time; the third information is used to determine the second time, and the third information is transmitted through the air interface.

In one embodiment, the first receiver 1101 also receives fourth information; the fourth information is used to determine a time length of one of the X time windows.

Embodiment 12

Figure 12:
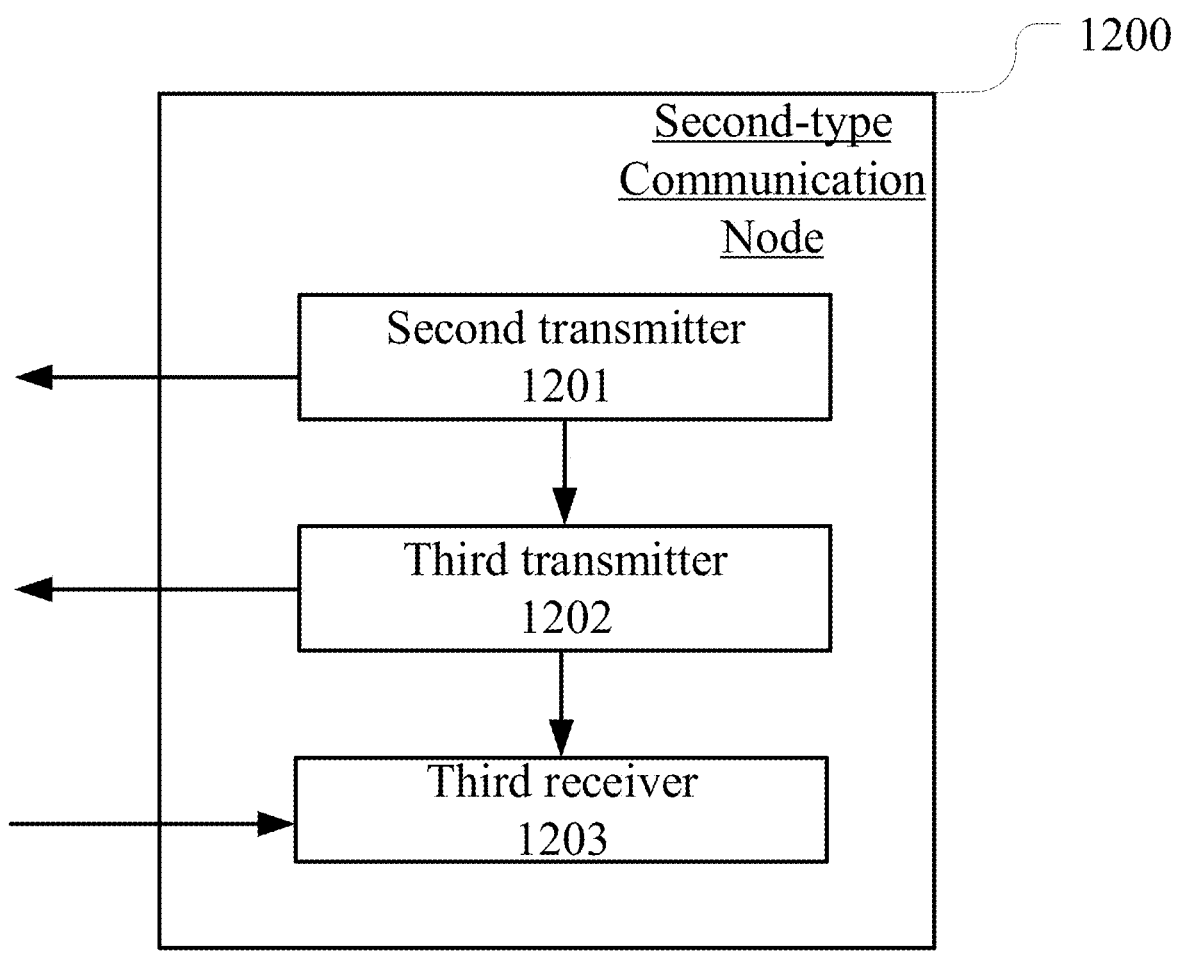
FIG. 12 illustrates a structure block diagram of a processing device in a second-type communication node according to one embodiment of the present disclosure.

Embodiment 12 illustrates a structure diagram of a processing device in a second-type communication node, as shown in FIG. 12. In FIG. 12, the second-type communication node processing device 1200 is mainly composed of a second transmitter 1201, a third transmitter 1202 and a third receiver 1203. The second transmitter 1201 comprises the transmitter/receiver 416 (including the antenna 420), the transmitting processor 415 and the controller/processor 440 in FIG. 4 of the present disclosure; the third transmitter 1202 comprises the transmitter/receiver 416 (including the antenna 420), the transmitting processor 415 and the controller/processor 440 in FIG. 4 of the present disclosure; the third receiver 1203 comprises the transmitter/receiver 416 (including the antenna 420), the receiving processor 412 and the controller/processor 440 in FIG. 4 of the present disclosure.

In embodiment 12, the second transmitter 1201 transmits first information; the third transmitter 1202 transmits a first signaling in X time windows; and the third receiver 1203 receives a first radio signal; wherein the first information is used to determine the X time windows, and time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information, the first signaling, the second information and the first radio signal are all transmitted through an air interface.

In one embodiment, the third transmitter 1202 also transmits second information; the second information is used to determine the first transmission timing adjustment, and the first signaling is used to determine time-frequency resources occupied by a transmission of the second information, the second information being transmitted through the air interface.

In one embodiment, the third receiver 1203 also receives a second radio signal; air-interface resources occupied by the second radio signal are used to determine a first characteristic identity, and the first signaling carries the first characteristic identity; an end time for a transmission of the second radio signal is used to determine start times of the X time windows, and the second radio signal is transmitted through the air interface.

In one embodiment, any two of the X time windows are orthogonal in time domain; the first signaling belongs to a first time window, and the first time window is one of the X time windows; the second transmission timing adjustment is one of Q candidate timing adjustments, the Q being a positive integer greater than 1, and a position of the first time window among the X time windows is used to determine the second transmission timing adjustment out of the Q candidate timing adjustments.

In one embodiment, the third transmitter 1202 also transmits third information; the start time for the transmission of the first radio signal is a first time, and an expected start time for a reception of the first radio signal is a second time; a sum of the first transmission timing adjustment and the second transmission timing adjustment is used to determine a time length of a time interval between the first time and the second time; the third information is used to determine the second time, and the third information is transmitted through the air interface.

In one embodiment, the second transmitter 1201 also transmits fourth information; the fourth information is used to determine time length of one of the X time windows.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. A first-type communication node or a UE or a terminal in the present disclosure includes but not limited to mobile phones, tablet computers, laptops, network cards, low-power devices, eMTC devices, NB-IOT devices, vehicle-mounted communication equipment, aircrafts, airplanes, unmanned aerial vehicles (UAV), telecontrolled aircrafts and other wireless communication devices. The second-type communication node or the base station or the network side device in the present disclosure includes but is not limited to the macro-cellular base stations, micro-cellular base stations, home base stations, relay base stations, eNB, gNB, Transmitting and Receiving Point (TRP), relay satellites, satellite base stations, air base stations and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first-type communication node for wireless communications, comprising:
receiving first information;
receiving a first signaling in X time windows; and
transmitting a first radio signal;
wherein the first information is used to determine the X time windows, and time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information, the first signaling, the second information and the first radio signal are all transmitted through an air interface.

2. The method according to claim 1, comprising:
receiving second information;
wherein the second information is used to determine the first transmission timing adjustment, and the first signaling is used to determine time-frequency resources occupied by a transmission of the second information, the second information being transmitted through the air interface.

3. The method according to claim 1, comprising:
transmitting a second radio signal;
wherein air-interface resources occupied by the second radio signal are used to determine a first characteristic identity, and the first signaling carries the first characteristic identity; an end time for a transmission of the second radio signal is used to determine start times of the X time windows, and the second radio signal is transmitted through the air interface.

4. The method according to claim 1, wherein any two of the X time windows are orthogonal in time domain; the first signaling belongs to a first time window, and the first time window is one of the X time windows; the second transmission timing adjustment is one of Q candidate timing adjustments, the Q being a positive integer greater than 1, and a position of the first time window among the X time windows is used to determine the second transmission timing adjustment out of the Q candidate timing adjustments.

5. The method according to claim 1, comprising:
receiving third information;
wherein the start time for the transmission of the first radio signal is a first time, and an expected start time for a reception of the first radio signal is a second time; a sum of the first transmission timing adjustment and the second transmission timing adjustment is used to determine a time length of a time interval between the first time and the second time; the third information is used to determine the second time, and the third information is transmitted through the air interface;
or, comprising:
receiving fourth information;
wherein the fourth information is used to determine a time length of one of the X time windows.

6. A method in a second-type communication node in wireless communications, comprising:
transmitting first information;
transmitting a first signaling in X time windows; and
receiving a first radio signal;
wherein the first information is used to determine the X time windows, time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information, the first signaling, the second information and the first radio signal are all transmitted through an air interface.

7. The method according to claim 6, comprising:
transmitting second information;
wherein the second information is used to determine the first transmission timing adjustment, and the first signaling is used to determine time-frequency resources occupied by a transmission of the second information, the second information being transmitted through the air interface.

8. The method according to claim 6, comprising:
receiving a second radio signal;
wherein air-interface resources occupied by the second radio signal are used to determine a first characteristic identity, and the first signaling carries the first characteristic identity; an end time for a transmission of the second radio signal is used to determine start times of the X time windows, and the second radio signal is transmitted through the air interface.

9. The method according to claim 6, wherein any two of the X time windows are orthogonal in time domain; the first signaling belongs to a first time window, and the first time window is one of the X time windows; the second transmission timing adjustment is one of Q candidate timing adjustments, the Q being a positive integer greater than 1, and a position of the first time window among the X time windows is used to determine the second transmission timing adjustment out of the Q candidate timing adjustments.

10. The method according to claim 6, comprising:
transmitting third information;
wherein the start time for the transmission of the first radio signal is a first time, and an expected start time for a reception of the first radio signal is a second time; a sum of the first transmission timing adjustment and the second transmission timing adjustment is used to determine a time length of a time interval between the first time and the second time; the third information is used to determine the second time, and the third information is transmitted through the air interface;
or, comprising:
transmitting fourth information;
wherein the fourth information is used to determine a time length of one of the X time windows.

11. A first-type communication node for wireless communications, comprising:
a first receiver, receiving first information;
a second receiver, receiving a first signaling in X time windows; and
a first transmitter, transmitting a first radio signal;
wherein the first information is used to determine the X time windows, time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information, the first signaling, the second information and the first radio signal are all transmitted through an air interface.

12. The first-type communication node according to claim 11, wherein the second receiver receives second information; wherein the second information is used to determine the first transmission timing adjustment, and the first signaling is used to determine time-frequency resources occupied by a transmission of the second information, the second information being transmitted through the air interface.

13. The first-type communication node according to claim 11, wherein the first transmitter transmits a second radio signal; wherein air-interface resources occupied by the second radio signal are used to determine a first characteristic identity, and the first signaling carries the first characteristic identity; an end time for a transmission of the second radio signal is used to determine start times of the X time windows, and the second radio signal is transmitted through the air interface.

14. The first-type communication node according to claim 11, wherein any two of the X time windows are orthogonal in time domain; the first signaling belongs to a first time window, and the first time window is one of the X time windows; the second transmission timing adjustment is one of Q candidate timing adjustments, the Q being a positive integer greater than 1, and a position of the first time window among the X time windows is used to determine the second transmission timing adjustment out of the Q candidate timing adjustments.

15. The first-type communication node according to claim 11, wherein the second receiver receives third information; wherein the start time for the transmission of the first radio signal is a first time, and an expected start time for a reception of the first radio signal is a second time; a sum of the first transmission timing adjustment and the second transmission timing adjustment is used to determine a time length of a time interval between the first time and the second time; the third information is used to determine the second time, and the third information is transmitted through the air interface;
or the first receiver receives fourth information; wherein the fourth information is used to determine a time length of one of the X time windows.

16. A second-type communication node for wireless communications, comprising:
a second transmitter, transmitting first information;
a third transmitter, transmitting a first signaling in X time windows; and
a third receiver, receiving a first radio signal;
wherein the first information is used to determine the X time windows, time-domain resources occupied by the first signaling are first time-domain resources, the X being a positive integer greater than 1; a start time for a transmission of the first radio signal is related to a first transmission timing adjustment and a second transmission timing adjustment; the first signaling is used to determine the first transmission timing adjustment, and the second transmission timing adjustment is related to a position of the first time-domain resources in the X time windows; the first information, the first signaling, the second information and the first radio signal are all transmitted through an air interface.

17. The second-type communication node according to claim 16, wherein the third transmitter transmits second information; wherein the second information is used to determine the first transmission timing adjustment, and the first signaling is used to determine time-frequency resources occupied by a transmission of the second information, the second information being transmitted through the air interface.

18. The second-type communication node according to claim 16, wherein the third receiver receives a second radio signal; wherein air-interface resources occupied by the second radio signal are used to determine a first characteristic identity, and the first signaling carries the first characteristic identity; an end time for a transmission of the second radio signal is used to determine start times of the X time windows, and the second radio signal is transmitted through the air interface.

19. The second-type communication node according to claim 16, wherein any two of the X time windows are orthogonal in time domain; the first signaling belongs to a first time window, and the first time window is one of the X time windows; the second transmission timing adjustment is one of Q candidate timing adjustments, the Q being a positive integer greater than 1, and a position of the first time window among the X time windows is used to determine the second transmission timing adjustment out of the Q candidate timing adjustments.

20. The second-type communication node according to claim 16, wherein the third transmitter transmits third information; wherein the start time for the transmission of the first radio signal is a first time, and an expected start time for a reception of the first radio signal is a second time; a sum of the first transmission timing adjustment and the second transmission timing adjustment is used to determine a time length of a time interval between the first time and the second time; the third information is used to determine the second time, and the third information is transmitted through the air interface;

or the second transmitter transmits fourth information; wherein the fourth information is used to determine a time length of one of the X time windows.

* * * * *